United States Patent
Chang et al.

(10) Patent No.: US 12,483,121 B2
(45) Date of Patent: Nov. 25, 2025

(54) POWER SUPPLY SYSTEM AND POWER FACTOR CORRECTION CONTROL CIRCUIT AND CONTROL METHOD THEREOF

(71) Applicant: Richtek Technology Corporation, Hsinchu (TW)

(72) Inventors: Wei-Hsu Chang, Hsinchu (TW); Shih-Ho Hsu, New Taipei (TW); Mao-Hui Kuo, New Taipei (TW); Ta-Yung Yang, Taoyuan (TW)

(73) Assignee: Richtek Technology Corporation, Hsinchu (TW)

( * ) Notice: Subject to any disclaimer, the term of this patent is extended or adjusted under 35 U.S.C. 154(b) by 313 days.

(21) Appl. No.: 18/463,244

(22) Filed: Sep. 7, 2023

(65) Prior Publication Data
US 2024/0413744 A1    Dec. 12, 2024

(30) Foreign Application Priority Data
Jun. 6, 2023  (TW) ................. 112121089

(51) Int. Cl.
*H02M 1/42*    (2007.01)
*H02M 3/335*   (2006.01)

(52) U.S. Cl.
CPC ..... *H02M 1/4208* (2013.01); *H02M 3/33576* (2013.01)

(58) Field of Classification Search
CPC .................. H02M 1/4208; H02M 3/33576
See application file for complete search history.

(56) References Cited

U.S. PATENT DOCUMENTS

| | | | |
|---|---|---|---|
| 5,349,284 A | 9/1994 | Whittle | |
| 5,461,303 A * | 10/1995 | Leman | H02M 1/4225 323/209 |
| 2006/0062031 A1 * | 3/2006 | Kim | G05F 1/70 363/89 |
| 2008/0025056 A1 * | 1/2008 | Chen | H02M 1/4225 363/80 |
| 2010/0014326 A1 * | 1/2010 | Gu | H02M 1/4225 363/45 |

* cited by examiner

*Primary Examiner* — Adolf D Berhane
(74) *Attorney, Agent, or Firm* — Huan-Yi Lin

(57) ABSTRACT

A power factor correction control circuit for correcting a power factor of a rectified power to generate an output power supplied to a load, includes: a reference voltage generator circuit generating a reference voltage according to a rectified voltage of the rectified power; and a feedback modulation circuit generating a modulation control signal based upon the reference voltage and a feedback signal related to an output voltage of the output power, to control at least one switch of a power stage circuit to switch an inductor in the power stage circuit and to thereby regulate the output voltage. The reference voltage generator circuit selects one of at least two candidate voltages as the reference voltage according to a comparison result between the rectified voltage and at least one threshold, such that the output voltage is at least partially positively correlated with the rectified voltage.

28 Claims, 19 Drawing Sheets

POWER SUPPLY SYSTEM AND POWER FACTOR CORRECTION CONTROL CIRCUIT AND CONTROL METHOD THEREOF

CROSS REFERENCE

The present invention claims priority to the TW patent application No. 112121089, filed on Jun. 6, 2023, which application is incorporated herein by its reference in its entirety.

BACKGROUND OF THE INVENTION

Field of Invention

The present invention relates to a power supply system; particularly, it relates to such power supply system capable of regulating an output power in accordance with a peak of an input power. The present invention also relates to a power factor correction control circuit and a control method, both of which are configured to operably control the aforementioned power supply system.

Description of Related Art

Please refer to FIG. 1A, which shows a schematic diagram of a conventional power supply system 9000. As shown in FIG. 1A, the conventional power supply system 9000 includes: a rectifier 92 and a power factor correction conversion circuit 900. The rectifier 92 rectifies an alternating current (AC) voltage to generate a rectified voltage VBD. The power factor correction conversion circuit 900 converts the rectified voltage VBD to an output voltage VO of which the power factor is corrected. The power factor correction conversion circuit 900 includes: a power factor correction control circuit 90 and a power stage circuit 91. The power stage circuit 91 is a boost converter and the power stage circuit 91 includes: switch Swa, a diode Da and an inductor La. The switch Swa is an N-type metal oxide semiconductor (MOS) device. The power factor correction control circuit 90 generates a modulation signal PWM based upon the rectified voltage VBD and a feedback voltage VF, so as to control the switching of the switch Swa, thereby converting the rectified voltage VBD to the output voltage VO. Additionally, the power factor correction control circuit 90 corrects a power factor of the conventional power supply system 9000.

Please refer to FIG. 1B, which illustrates signal waveform diagrams depicting a rectified voltage and an output voltage associated with the operation of the conventional power supply system 9000 shown in FIG. 1A. As shown in FIG. 1B, with rectification by the rectifier 92, the rectified voltage VBD is an inphase sinusoidal waveform which is equal to or greater than zero. The output voltage VO generated by the conventional power factor correction conversion circuit 900 is usually a constant which is greater than the rectified voltage VBD.

The prior art shown in FIG. 1A and FIG. 1B has the following drawbacks that: the output voltage VO is a constant and is not adaptively regulated based upon the rectified voltage VBD. The most common voltage level of the output voltage VO is for example 400 volts (V), and a minimum effective voltage level of the rectified voltage VBD is for example 85V. However, in this case, it will undesirably incur the MOS devices in the power stage circuit 91 to have a relatively greater drain-source voltage, which will unwantedly result in energy consumption and low conversion efficiency.

In view of the above, to overcome the drawbacks in the prior art, the present invention proposes a power supply system capable of regulating an output voltage in accordance with a peak of a rectified voltage. Besides, the voltage level of the output voltage Vo can be adjusted via a programmable and settable voltage external to an integrated circuit (IC). Because an output voltage of the present invention is adjusted in accordance with a peak of a rectified voltage, unwanted conduction power loss and unwanted switching loss of MOS devices in the power stage circuit can be effectively reduced. Moreover, because a size of an inductor in the power stage circuit can be shrinked, conversion efficiency of the present invention can be desirably enhanced.

SUMMARY OF THE INVENTION

From one perspective, the present invention provides a power factor correction control circuit, which is configured to operably correct a power factor of a rectified power to generate an output power supplied to a load; the power factor correction control circuit comprising: a reference voltage generator circuit, which is configured to operably generate a reference voltage according to a rectified voltage of the rectified power; and a feedback modulation circuit, which is configured to operably generate a modulation control signal based upon the reference voltage and a feedback signal related to an output voltage of the output power, so as to control at least one switch of a power stage circuit to switch an inductor in the power stage circuit and to thereby regulate the output voltage; wherein the reference voltage generator circuit is configured to operably select one of at least two candidate voltages as the reference voltage according to a comparison result between the rectified voltage and at least one determination threshold, such that the output voltage is at least partially positively correlated with the rectified voltage.

In one embodiment, the power factor correction control circuit is implemented as an integrated circuit (IC), wherein the at least two candidate voltages are generated through one of the following ways: at least one of the at least two candidate voltages is generated internal to the IC; at least one of the at least two candidate voltages is generated external to the IC; or wherein the at least two candidate voltages include: two candidate voltages, wherein the two candidate voltages are both generated internal to the IC.

In one embodiment, the at least two candidate voltages include: a first candidate voltage and a second candidate voltage; wherein the first candidate voltage is generated external to the IC, and the second candidate voltage is generated internal to the IC; wherein the at least one determination threshold includes: a first determination threshold; wherein the reference voltage generator circuit includes: a comparator circuit, which is configured to operably compare a rectification-related signal with a threshold voltage, so as to generate a comparison signal, wherein the rectification-related signal is correlated with the rectified voltage, and the threshold voltage is correlated with the first determination threshold; and a selector circuit, which is configured to operably select one of the first candidate voltage and the second candidate voltage as the reference voltage according to the comparison signal.

In one embodiment, the reference voltage generator circuit further includes: a plurality of diodes, which are configured to operably shunt a preset candidate voltage and an overwriting candidate voltage, so that the plurality of diodes are configured to operably select one of the preset candidate voltage and the overwriting candidate voltage as the first candidate voltage through comparing the preset candidate voltage with the overwriting candidate voltage; wherein the overwriting candidate voltage is generated external to the IC and is an external programmable voltage level.

In one embodiment, one of the plurality of diodes is coupled between the first candidate voltage and the second candidate voltage, so that the second candidate voltage is configured as the preset candidate voltage.

In one embodiment, the reference voltage generator circuit further includes: a setting current source, which is configured to operably provide a setting current at a setting pin of the IC; wherein the setting current is configured to operably set the overwriting candidate voltage external to the IC, wherein the overwriting candidate voltage is coupled to at least one of the plurality of diodes via the setting pin.

In one embodiment, the reference voltage generator circuit further includes: a plurality of diodes, which are configured to operably shunt a preset candidate voltage and an overwriting candidate voltage, so that the plurality of diodes are configured to operably select one of the preset candidate voltage and the overwriting candidate voltage as the reference voltage through comparing the preset candidate voltage with the overwriting candidate voltage; wherein the overwriting candidate voltage is generated external to the IC and is an external programmable voltage level; wherein the selector circuit is configured to operably select one of the first candidate voltage and the second candidate voltage as the preset candidate voltage according to the comparison signal.

In one embodiment, the overwriting candidate voltage is configured to operably clamp the preset candidate voltage, such that the reference voltage is clamped at the overwriting candidate voltage.

In one embodiment, the rectification-related signal is generated by dividing and filtering the rectified voltage; or the rectification-related signal is generated by an auxiliary winding, wherein the auxiliary winding is magnetically coupled to the inductor, wherein the power stage circuit is configured to operably switch the inductor, so as to convert the rectified voltage to the output voltage.

In one embodiment, the power stage circuit operates in a boundary conduction mode (BCM) or a discontinuous conduction mode (DCM).

From another perspective, the present invention provides a power supply system, comprising: a rectifier, which is configured to operably convert an alternating current (AC) power to a rectified power; and a power factor correction conversion circuit, which is configured to operably convert the rectified power to an output power supplied to a load; wherein the power factor correction conversion circuit includes: a power stage circuit including: at least one switch and an inductor; and a power factor correction control circuit, which is configured to operably correct a power factor of the rectified power, wherein the power factor correction control circuit includes: a reference voltage generator circuit, which is configured to operably generate a reference voltage according to a rectified voltage of the rectified power; and a feedback modulation circuit, which is configured to operably generate a modulation control signal based upon the reference voltage and a feedback signal related to an output voltage of the output power, so as to control at least one switch of a power stage circuit to switch an inductor in the power stage circuit and to thereby regulate the output voltage; wherein the reference voltage generator circuit is configured to operably select one of at least two candidate voltages as the reference voltage according to a comparison result between the rectified voltage and at least one determination threshold, such that the output voltage is at least partially positively correlated with the rectified voltage.

In one embodiment, the load includes: an isolated power conversion circuit having: a transformer, a primary side switching circuit and a secondary side switching circuit; wherein a primary side winding and a secondary side winding of the transformer are coupled to the primary side switching circuit and the secondary side switching circuit, respectively; wherein the isolated power conversion circuit is configured to operably convert the output power coupled to the primary side switching circuit to another output power coupled to the secondary side switching circuit.

From yet another perspective, the present invention provides a control method, which is configured to operably correct a power factor of a rectified power to generate an output power supplied to a load; the control method comprising the following steps: generating a reference voltage according to a rectified voltage of the rectified power; and generating a modulation control signal based upon the reference voltage and a feedback signal related to an output voltage of the output power, so as to control at least one switch of a power stage circuit to switch an inductor in the power stage circuit and to thereby regulate the output voltage; wherein the step for generating the reference voltage includes the following steps: selecting one of at least two candidate voltages as the reference voltage according to a comparison result between the rectified voltage and at least one determination threshold, such that the output voltage is at least partially positively correlated with the rectified voltage.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies. For better understanding the essence of the present invention, practical implementation details will be described in the embodiments below. It should be understood that such details are not for limiting the broadest scope of the present invention.

Figure 1A:
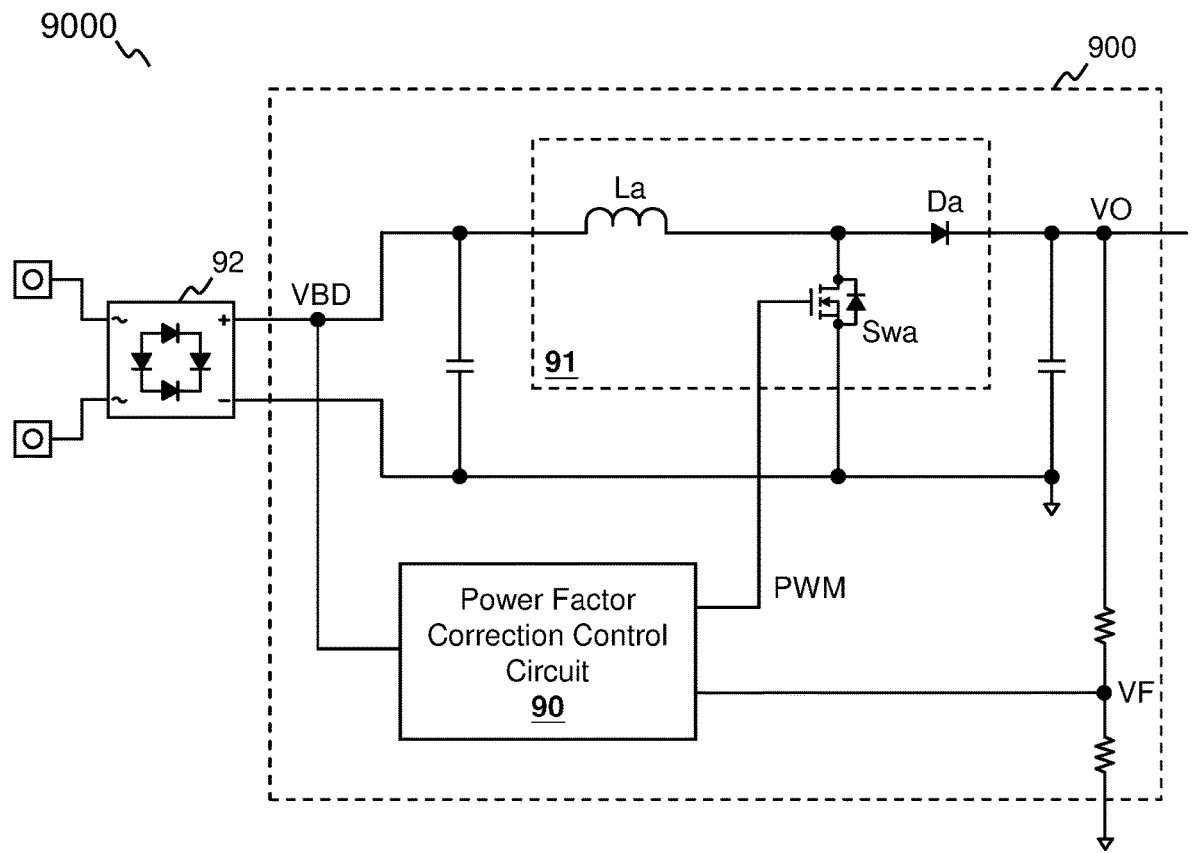
FIG. 1A shows a schematic diagram of a conventional power supply system.
Figure 1B:
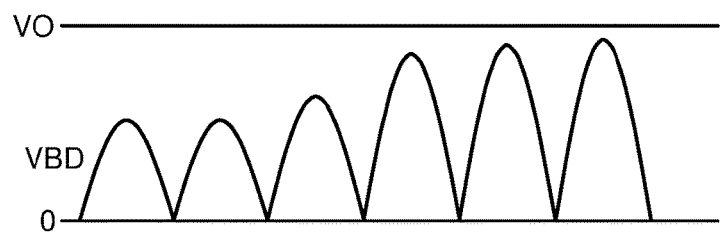
FIG. 1B illustrates signal waveform diagrams depicting a rectified voltage and an output voltage associated with the operation of the conventional power supply system shown in FIG. 1A.
Figure 2A:
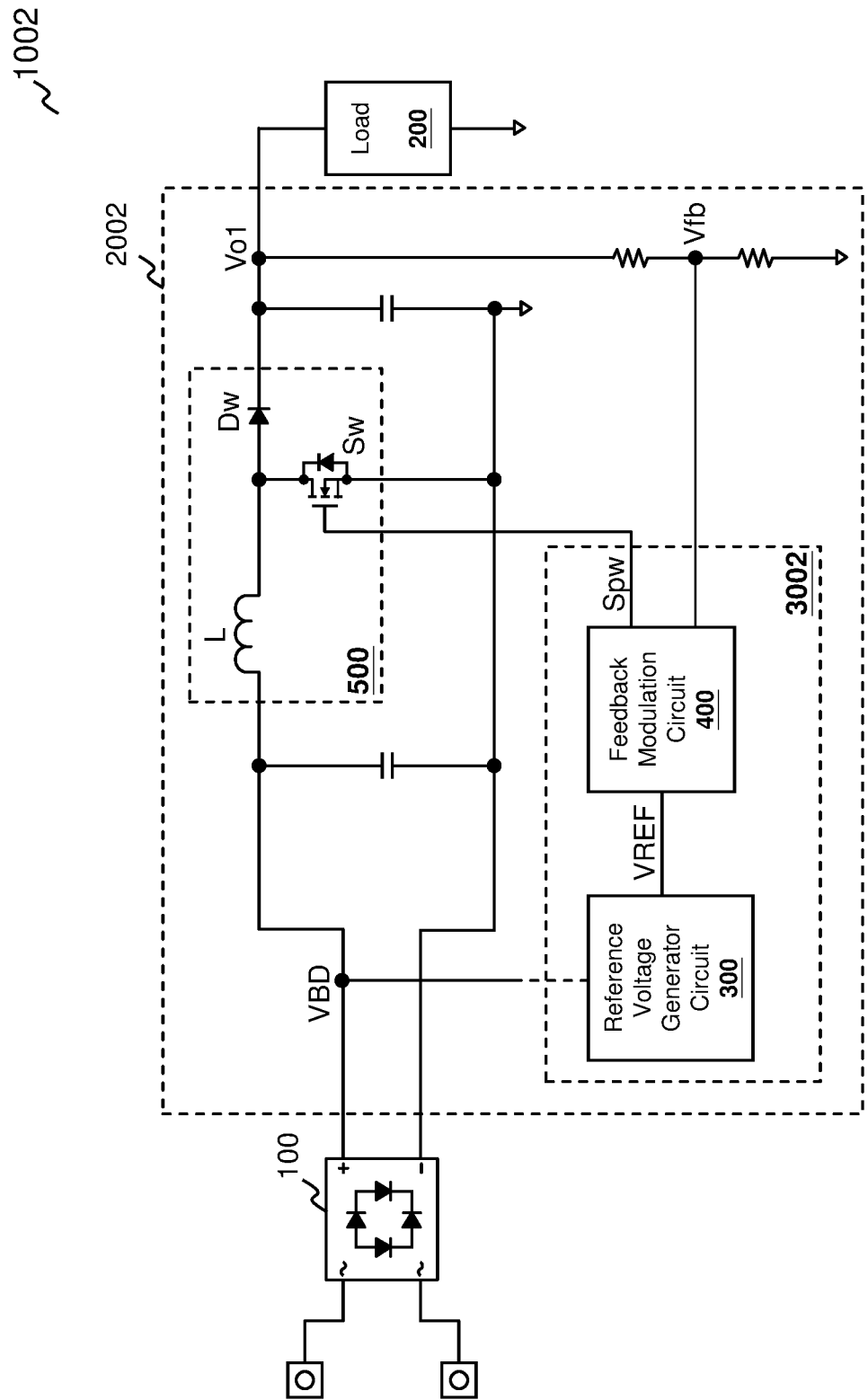
FIG. 2A shows a block diagram of a power supply system according to an embodiment of the present invention.

Please refer to FIG. 2A, which shows a block diagram of a power supply system according to an embodiment of the present invention. In one embodiment, as shown in FIG. 2A, the power supply system 1002 includes: a rectifier 100 and a power factor correction conversion circuit 2002. In one embodiment, the rectifier 100 is configured to operably rectify an alternating current (AC) power to generate a rectified power. The power factor correction conversion circuit 2002 is configured to operably convert the rectified power to an output power supplied to a load 200.

In one embodiment, the power factor correction conversion circuit 2002 includes: a power stage circuit 500 and a power factor correction control circuit 3002. The power stage circuit 500 is for example a boost converter and the power stage circuit 500 includes: at least one switch and an inductor. In this embodiment, the at least one switch includes a switch Sw and a diode Dw. The switch Sw corresponds to a low side switch in the power stage circuit 500, and the diode Dw corresponds to a high side switching device in the power stage circuit 500. The switch Sw is an N-type metal oxide semiconductor (MOS) device. In other embodiments, the diode Dw can be replaced by a switch. In one embodiment, the power factor correction control circuit 3002 is configured to operably correct a power factor of the rectified power to generate the output power. In one embodiment, the power factor correction control circuit 3002 includes: a reference voltage generator circuit 300 and a feedback modulation circuit 400.

In one embodiment, the reference voltage generator circuit 300 is configured to operably generate a reference voltage VREF according to a rectified voltage VBD of the rectified power. In one embodiment, the feedback modulation circuit 400 is configured to operably generate a modulation control signal Spw based upon the reference voltage and a feedback signal Vfb related to the output voltage Vo1 of the output power, so as to control the at least one switch (i.e., switch Sw) of the power stage circuit 500 to switch an inductor L in the power stage circuit 500 and to thereby regulate the output voltage Vo1. In one embodiment, the reference voltage generator circuit 300 is configured to operably select one of at least two candidate voltages as the reference voltage VREF according to a comparison result between the rectified voltage VBD and at least one determination threshold, such that the output voltage Vo1 is at least partially positively correlated with the rectified voltage VBD. The operation details pertinent to the foregoing at least one determination threshold as well as the foregoing at least two candidate voltages will be elaborated in more detail in the following embodiments.

Figure 2B:
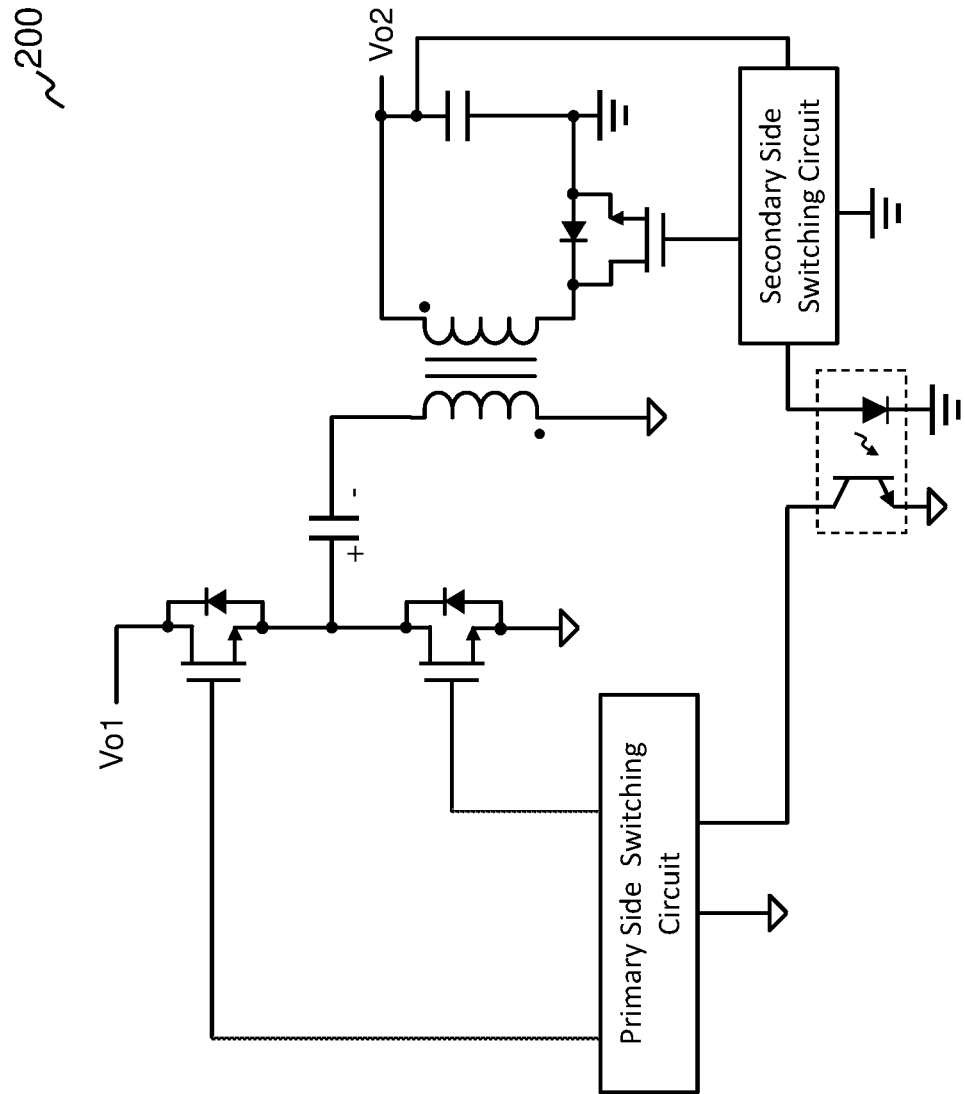
FIG. 2B shows a schematic diagram of a load in a power supply system according to an embodiment of the present invention.

Please refer to FIG. 2B, which shows a schematic diagram of a load in a power supply system according to an embodiment of the present invention. In one embodiment, the load shown in FIG. 2A includes: an isolated power conversion circuit (as shown in FIG. 2B). In this embodiment, the isolated power conversion circuit is configured to operably convert the output voltage Vo1 coupled to a primary side switching circuit to another output voltage Vo2 coupled to a secondary side switching circuit. In one embodiment, the isolated power conversion circuit includes: a transformer, a primary side switching circuit and a secondary side switching circuit. A primary side winding and a secondary side winding of the transformer are coupled to the primary side switching circuit and the secondary side switching circuit, respectively.

Figure 3:
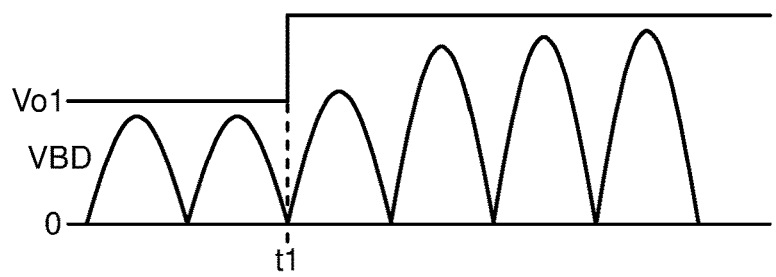
FIG. 3 illustrates signal waveform diagrams depicting a rectified voltage and an output voltage associated with the operation of the power supply system shown in FIG. 2A according to an embodiment of the present invention.

Please refer to FIG. 3, which illustrates signal waveform diagrams depicting a rectified voltage and an output voltage associated with the operation of the power supply system shown in FIG. 2A according to an embodiment of the present invention. In one embodiment, the output voltage Vo1 is at least partially positively correlated with a peak of the rectified voltage VBD due to the output voltage Vo1 is regulated by the power factor correction control circuit 3002 of the present invention. For example, in this embodiment, as shown in FIG. 3, when the peak of the rectified voltage VBD rises up subsequent to a time point t1, the output voltage Vo1 will be accordingly turned from a low level to a high level subsequent to the time point t1. Through the regulation upon the output voltage Vo1 via the power factor correction control circuit 3002 of the present invention, unwanted energy consumption of MOS devices (i.e., switch Sw) in the power stage circuit 500 can be effectively reduced. Moreover, because a size of the inductor L in the power stage circuit 500 can be shrinked, conversion efficiency of the present invention can be desirably enhanced.

Figure 4A:
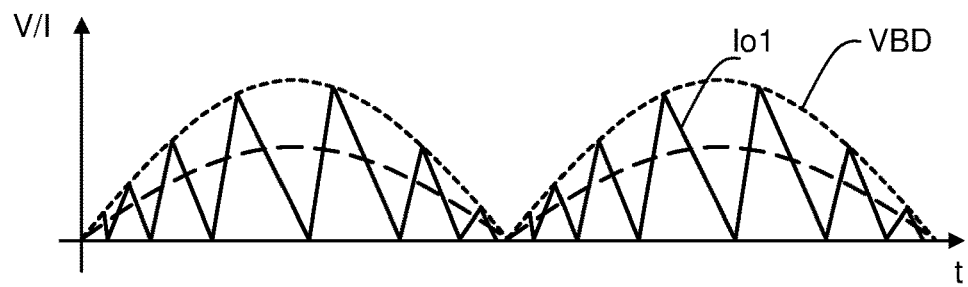
FIG. 4A illustrates signal waveform diagrams depicting signals associated with a situation where the power supply system operates in a boundary conduction mode (BCM) according to an embodiment of the present invention.
Figure 4B:
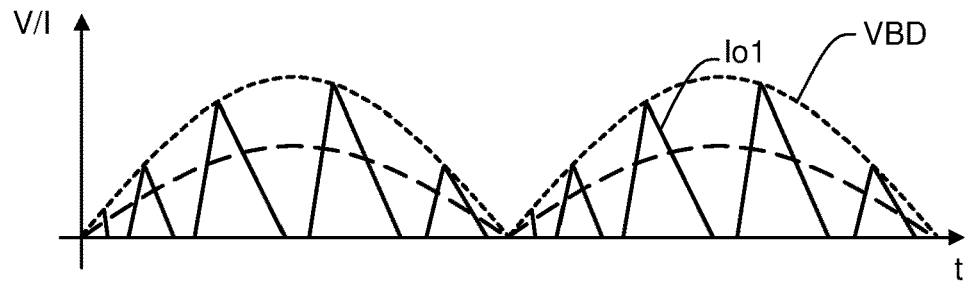
FIG. 4B illustrates signal waveform diagrams depicting signals associated with a situation where the power supply system operates in a discontinuous conduction mode (DCM) according to an embodiment of the present invention.

Please refer to FIG. 4A along with FIG. 4B. FIG. 4A illustrates signal waveform diagrams depicting signals associated with a situation where the power supply system operates in a boundary conduction mode (BCM) according to an embodiment of the present invention. FIG. 4B illustrates signal waveform diagrams depicting signals associated with a situation where the power supply system operates in a discontinuous conduction mode (DCM) according to an embodiment of the present invention. In one embodiment, the power stage circuit 500 shown in FIG. 2A operates in a boundary conduction mode (BCM) (as shown in FIG. 4A) or a discontinuous conduction mode (DCM) (as shown in FIG. 4B). As shown in FIG. 4A and FIG. 4B, an output current Io1 related to the output voltage Vo1 is illustrated by a solid line, and the rectified voltage VBD is illustrated by a short-dashed line, and an average of the output current Io1 is illustrated by a long-dashed line. In one embodiment, as shown in FIG. 4A and FIG. 4B, through the power factor correction on the rectified power via the power factor correction control circuit 3002 of the present invention, the average of the output current Io1 can track the rectified voltage VBD. As a consequence, the average of the output current Io1 is a sinusoidal waveform which is in-phase with the sinusoidal rectified voltage VBD.

Figure 5:
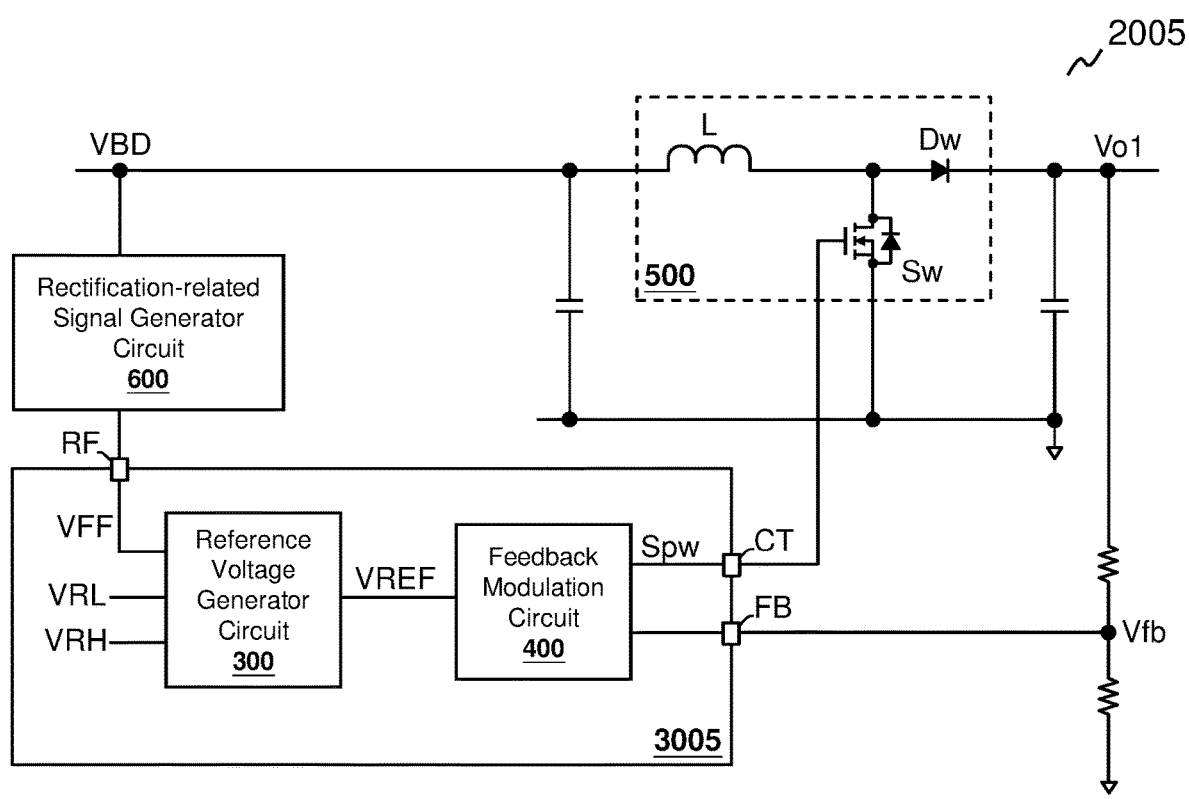
FIG. 5 shows a block diagram of a power factor correction conversion circuit in a power supply system according to an embodiment of the present invention.

Please refer to FIG. 5, which shows a block diagram of a power factor correction conversion circuit in a power supply system according to an embodiment of the present invention. The power factor correction conversion circuit 2005 of this embodiment shown in FIG. 5 is similar to the power factor correction conversion circuit 2002 of the embodiment shown in FIG. 2A, but is different in the following. As compared to the power factor correction conversion circuit 2002 of the embodiment shown in FIG. 2A, in one embodiment, the power factor correction conversion circuit 2005 of this embodiment shown in FIG. 5 further includes: a rectification-related signal generator circuit 600. In one embodiment, the rectification-related signal generator circuit 600 is configured to operably generate a rectification-related signal VFF in accordance with a rectified voltage VBD. In one embodiment, a power factor correction control circuit 3005 in the power factor correction conversion circuit 2005 is implemented as an integrated circuit (IC) (note that the term "IC" as may be used hereinafter throughout the entire descriptions of the present invention refers to the term "power factor correction control circuit"). The reference voltage generator circuit 300 is configured to operably detect a rectification-related signal VFF via a pin RF, so as to generate a reference voltage VREF. The feedback modulation circuit 400 is configured to operably detect a feedback signal Vfb via a pin FB, so as to generate a modulation control signal Spw based upon the reference voltage VREF and the feedback signal Vfb. In one embodiment, the accordingly generated modulation control signal Spw is configured to operably control the switching of the switch Sw via a pin CT.

In one embodiment, the power factor correction control circuit 3005, implemented as an IC, generates the at least two candidate voltages through one of the following ways: at least one of the at least two candidate voltages (as described in the embodiment shown in FIG. 2A) is generated internal to the IC; at least one of the at least two candidate voltages (as described in the embodiment shown in FIG. 2A) is generated external to the IC; or the at least two candidate voltages include: two candidate voltages (i.e., a first candidate voltage VRL and a second candidate voltage VRH), wherein the two candidate voltages are both generated internal to the IC (as shown in FIG. 5). The technical features pertinent to the aforementioned IC will be described in more detail in the following specific embodiments.

Figure 6:
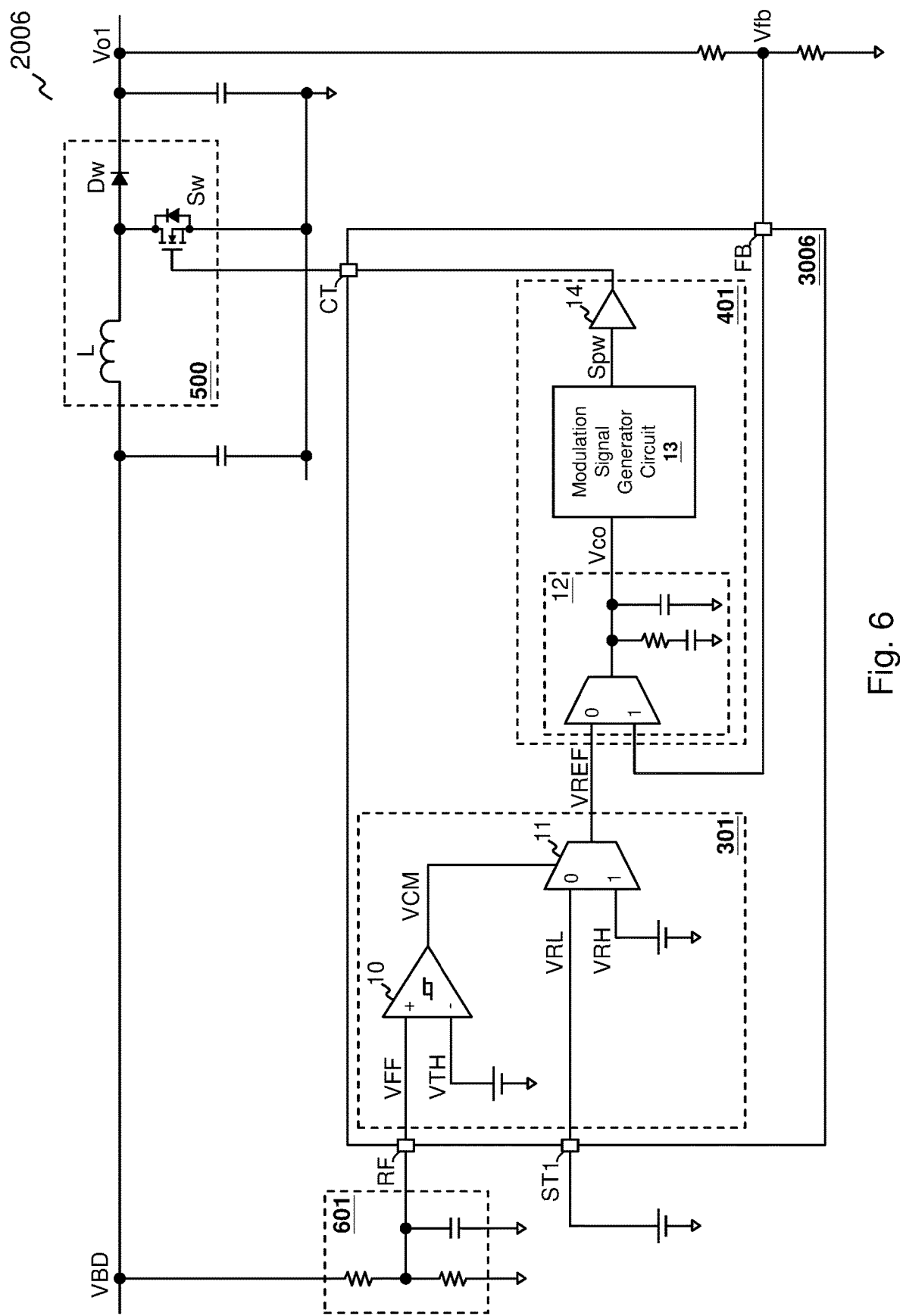
FIG. 6 shows a schematic diagram of a power factor correction conversion circuit in a power supply system according to an embodiment of the present invention.

Please refer to FIG. 6, which shows a schematic diagram of a power factor correction conversion circuit in a power supply system according to an embodiment of the present invention. The power factor correction conversion 2006 of this embodiment shown in FIG. 6 is similar to the power factor correction conversion circuit 2005 of the embodiment shown in FIG. 5, but is different in the following. As compared to the power factor correction conversion circuit 2005 of the embodiment shown in FIG. 5, in the embodiment shown in FIG. 6, the rectification-related signal generator circuit 601 includes: a voltage-divider consisting of two resistors and a filter capacitor. In one embodiment, the power factor correction control circuit 3006 includes: a reference voltage generator circuit 301 and a feedback modulation circuit 401. In one embodiment, the reference voltage generator circuit 301 includes: a comparator circuit 10 and a selector circuit 11. The feedback modulation circuit 401 includes: an error amplification and compensation circuit 12, a modulation signal generator circuit 13 and a driver 14.

In one embodiment, as shown in FIG. 6, the rectification-related signal generator circuit 601 is configured to operably divide and filter the rectified voltage VBD, so as to generate a rectification-related signal VFF. In one embodiment, the at least two candidate voltages described in the embodiment shown in FIG. 2A include: a first candidate voltage VRL and a second candidate voltage VRH, wherein the first candidate voltage VRL is generated external to the IC and is connected to the selector circuit 11 via a pin ST1, and the second candidate voltage VRH is generated internal to the IC. In this embodiment, the first candidate voltage VRL is set according to an external reference voltage, and the second candidate voltage VRH is generated based upon an internal reference voltage. It is worthwhile noting that, in other embodiments, the configuration of the first candidate voltage VRL and the configuration of the second candidate voltage VRH can be interchanged with each other. To elaborate in more detail, that is, in one embodiment, the second candidate voltage VRH is generated external to the IC and is connected to the selector circuit 11 via a pin ST1, and the first candidate voltage VRL is generated internal to the IC.

In one embodiment, the at least one determination threshold described in the embodiment shown in FIG. 2A includes: a first determination threshold. In one embodiment, the comparator circuit 10 is configured to operably compare a rectification-related signal VFF with a threshold voltage VTH, so as to generate a comparison signal VCM. In this embodiment, the rectification-related signal VFF is correlated with the rectified voltage VBD, and the threshold voltage VTH corresponds to the first determination threshold. In this embodiment, the selector circuit 11 is configured to operably select one of the first candidate voltage VRL and the second candidate voltage VRH as the reference voltage VREF according to the comparison signal VCM.

Figure 7:
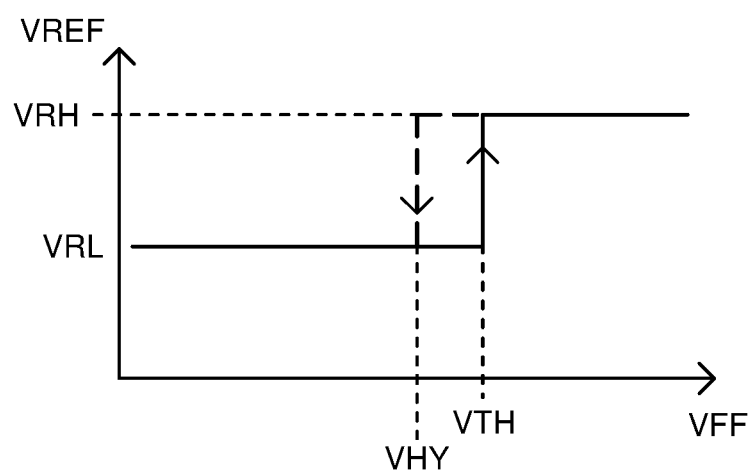
FIG. 7 shows a relationship diagram depicting a reference voltage of a power factor correction control circuit against a rectification-related signal of a power factor correction control circuit according to an embodiment of the present invention.

Please refer to FIG. 6 along with FIG. 7. FIG. 7 shows a relationship diagram depicting a reference voltage of a power factor correction control circuit against a rectification-related signal of a power factor correction control circuit according to an embodiment of the present invention. In one specific embodiment, the second candidate voltage VRH is greater than the first candidate voltage VRL. In one embodiment, the relationship between the threshold voltage VTH and the rectification-related signal VFF includes a hysteresis. To elaborate in more detail, on one hand, when a voltage level of the rectification-related signal VFF is not greater than the threshold voltage VTH, the comparison signal VCM controls the selector circuit 11 to select the first candidate voltage VRL as the reference voltage VREF. On the other hand, when the voltage level of the rectification-related signal VFF is greater than the threshold voltage VTH, the comparison signal VCM controls the selector circuit 11 to select the second candidate voltage VRH as the reference voltage VREF. Note that, as a result, in this case, the threshold voltage VTH is switched to a hysteresis voltage VHY, wherein the threshold voltage VTH is greater than the hysteresis voltage VHY, such that the relationship between the threshold voltage VTH and the rectification-related signal VFF includes the hysteresis (as mentioned above), thereby preventing noise resulted from a scenario where the voltage level of the rectification-related signal VFF is close to the threshold voltage VTH. In one embodiment, the comparator circuit 10 shown in FIG. 6 can adopt a comparator having a hysteresis characteristic, thus accomplishing the aforementioned hysteresis relationship.

Please refer to FIG. 3 along with FIG. 6 and FIG. 7. It is worthwhile noting that, in the embodiment shown in FIG. 6, because the reference voltage VREF of the power factor correction control circuit 3006 selects the first candidate voltage VRL or the second candidate voltage VRH as the reference voltage VREF according to whether the rectification-related signal VFF is smaller than or greater than the threshold voltage VTH and because the rectification-related signal VFF is correlated with the rectified voltage VBD, in this embodiment, as shown in FIG. 3, the output voltage Vo1 can be regulated at one of two different levels according to an amplitude of the peak of the rectified voltage VBD. Besides, it is worthwhile noting that, in this embodiment, a low level of the output voltage Vo1 (as shown by a duration prior to the time point t1 in FIG. 3) is correlated with the first candidate voltage VRL, and a high level of the output voltage Vo1 (as shown by a duration after the time point t1 in FIG. 3) is correlated with the second candidate voltage VRH.

Please still refer to FIG. 6. In one embodiment, the error amplification and compensation circuit 12 is configured to operably amplify a difference between the reference voltage VREF and the feedback signal Vfb, and configured to operably perform frequency compensation on the difference to generate a compensation signal Vco. In one embodiment, the modulation signal generator circuit 13 is configured to operably generate a modulation control signal Spw based upon the compensation signal Vco. Subsequently, the accordingly generated modulation control signal Spw is configured to control the switching of the switch Sw via the driver 14 and a pin CT.

Figure 8:
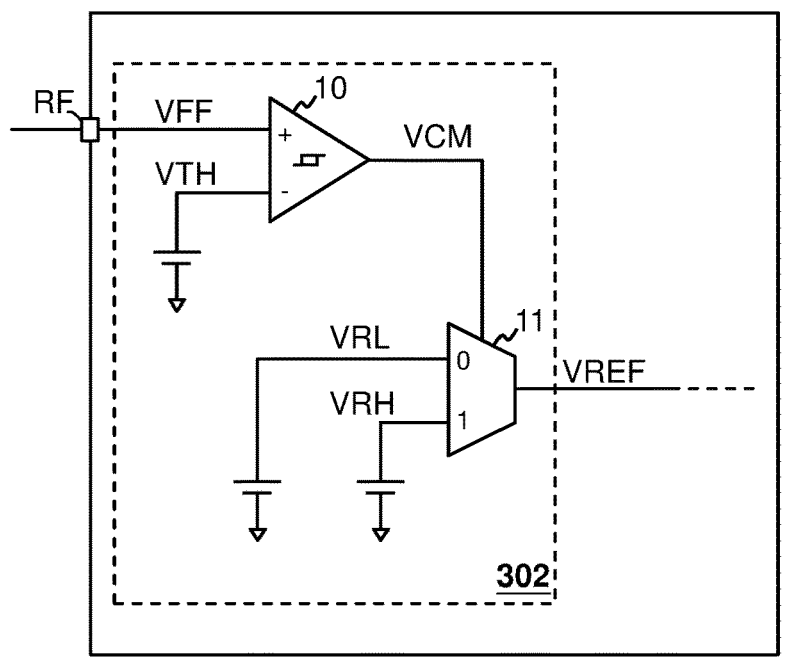
FIG. 8 and FIG. 9 respectively show schematic circuit diagrams of a reference voltage generator circuit in a power factor correction control circuit according to different embodiments of the present invention.
Figure 9:
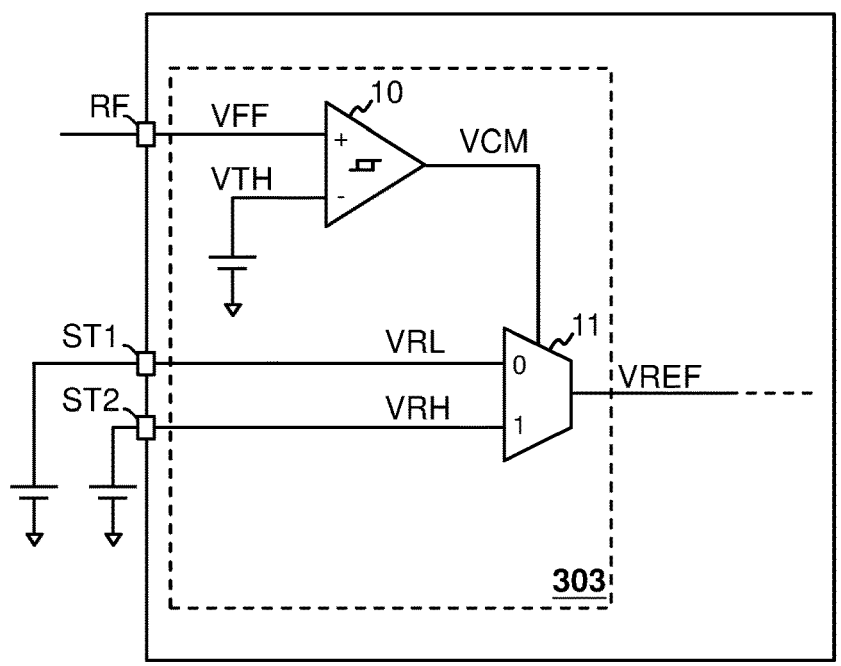

Please refer to FIG. 8 along with FIG. 9. FIG. 8 and FIG. 9 respectively show schematic circuit diagrams of a reference voltage generator circuit in a power factor correction control circuit according to different embodiments of the present invention. Each of the reference voltage generator circuit 302 of this embodiment shown in FIG. 8 and the reference voltage generator circuit 303 of this embodiment shown in FIG. 9 is similar to the reference voltage generator circuit 301 of the embodiment shown in FIG. 6, but is different in the following. In one embodiment, as shown in FIG. 8, a first candidate voltage VRL and a second candidate voltage VRH are both generated internal to the IC. On the contrary, in one embodiment, as shown in FIG. 9, the first candidate voltage VRL and the second candidate voltage VRH are both generated external to the IC. Besides, in this case, the second candidate voltage VRH is connected to the selector circuit 11 via a pin ST2.

Figure 10:
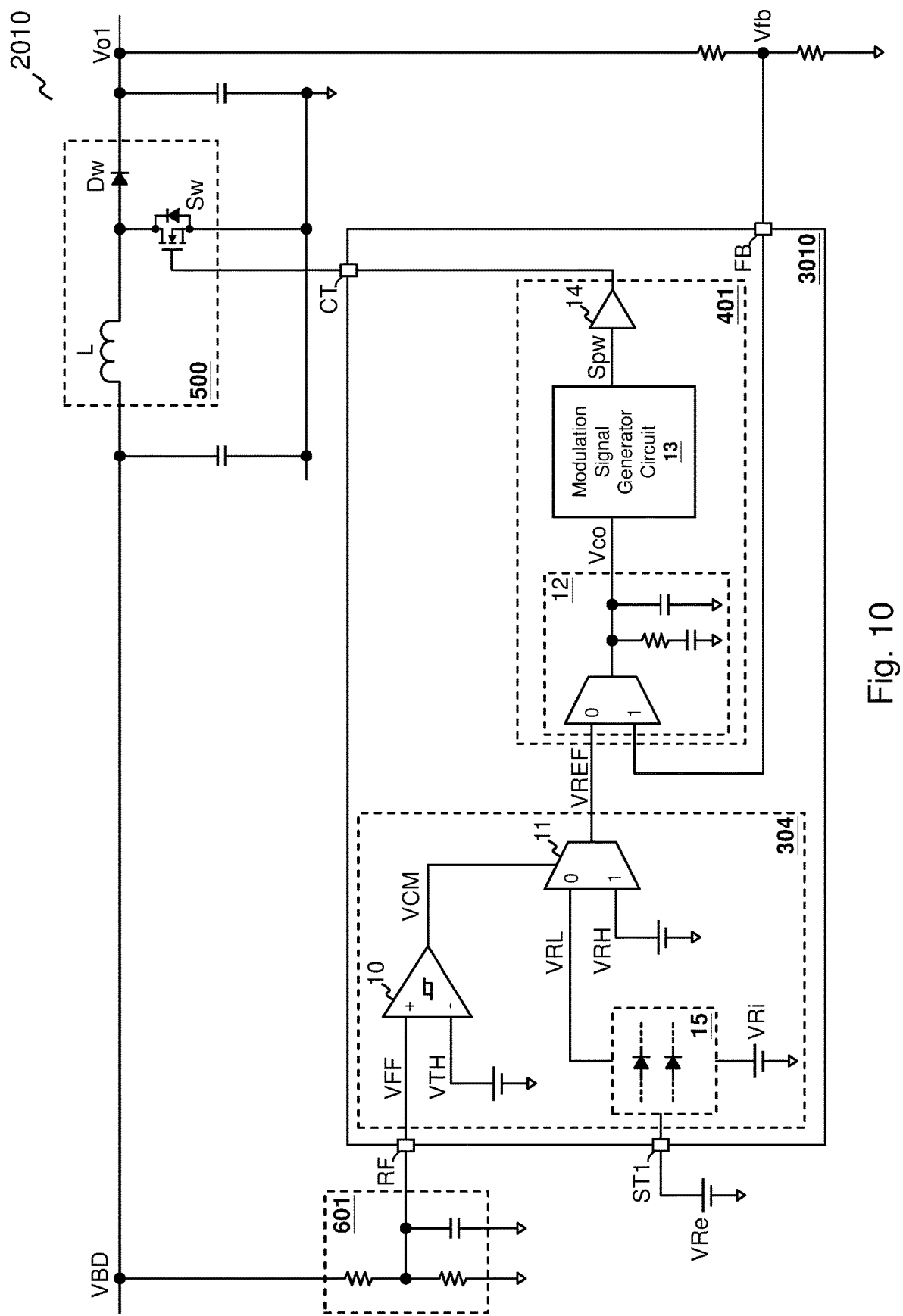
FIG. 10 shows a schematic diagram of a power factor correction conversion circuit in a power supply system according to an embodiment of the present invention.

Please refer to FIG. 10, which shows a schematic diagram of a power factor correction conversion circuit in a power supply system according to an embodiment of the present invention. The power factor correction conversion circuit 2010 of this embodiment shown in FIG. 10 is similar to the power factor correction conversion circuit 2006 of the embodiment shown in FIG. 6, but is different in the following. As compared to the power factor correction conversion circuit 2006 of the embodiment shown in FIG. 6, in one embodiment, a reference voltage generator circuit 304 in a power factor correction control circuit 3010 of this embodiment shown in FIG. 10 further includes: plural diodes 15, wherein the plural diodes 15 are configured to operably shunt a preset candidate voltage VRi and an overwriting candidate voltage VRe, so that the plural diodes 15 are configured to operably select one of the preset candidate voltage VRi and the overwriting candidate voltage VRe as the first candidate voltage VRL through comparing the preset candidate voltage VRi with the overwriting candidate voltage VRe.

In this embodiment, the overwriting candidate voltage VRe is generated external to the IC and is an external programmable voltage level, and the preset candidate voltage VRi is a constant voltage generated internal to the IC. The overwriting candidate voltage VRe is coupled to the plural diodes 15 via a pin ST1.

It is worthwhile noting that, the plural diodes 15 can select a relatively greater one or a relatively lower one between the preset candidate voltage and overwriting candidate voltage VRe according to various coupling approaches. The operation details of which will be elaborated in more detail in the following embodiments.

Figure 11A:
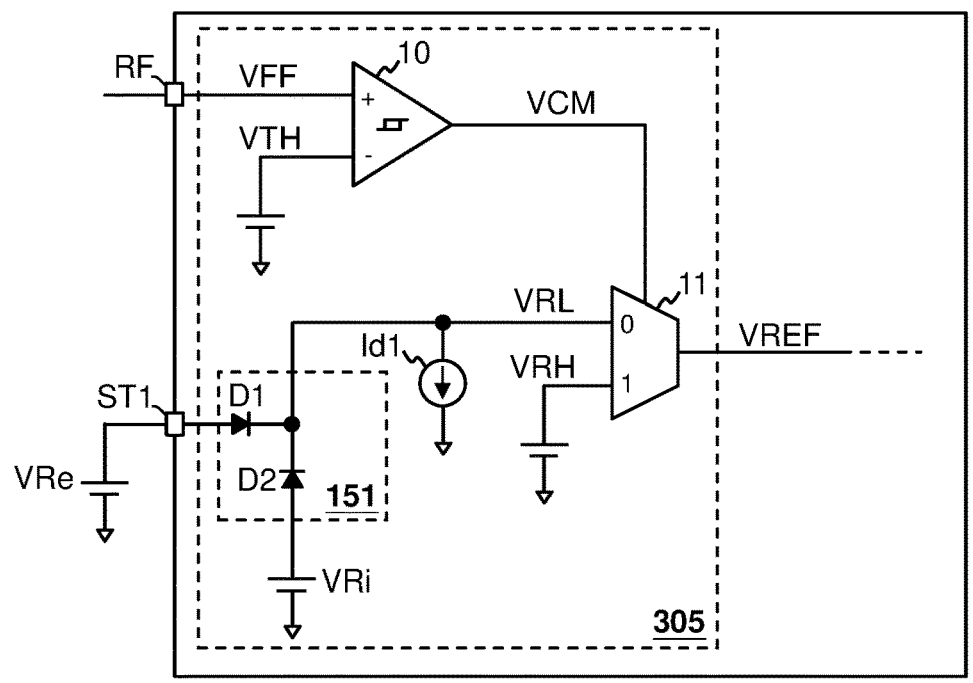
FIG. 11A shows a schematic circuit diagram of a reference voltage generator circuit corresponding to FIG. 10 in a power factor correction control circuit according to a specific embodiment of the present invention.

Please refer to FIG. 11A, which shows a schematic circuit diagram of a reference voltage generator circuit corresponding to FIG. 10 in a power factor correction control circuit according to a specific embodiment of the present invention. In one embodiment, in a reference voltage generator circuit 305 shown in FIG. 11A, plural diodes 151 includes: a diode D1 and a diode D2. The diode D1 is forwardly coupled from an overwriting candidate voltage VRe to a first candidate voltage VRL, and the diode D2 is forwardly coupled from a preset candidate voltage VRi to the first candidate voltage VRL, such that the preset candidate voltage VRi and the overwriting candidate voltage VRe are shunted with each other. In one embodiment, the reference voltage generator circuit 305 further includes: a current source Id1 coupled between the first candidate voltage VRL and a ground potential, wherein the current source Id1 is configured to ensure the diode D1 or the diode D2 is in forward conduction.

Figure 11B:
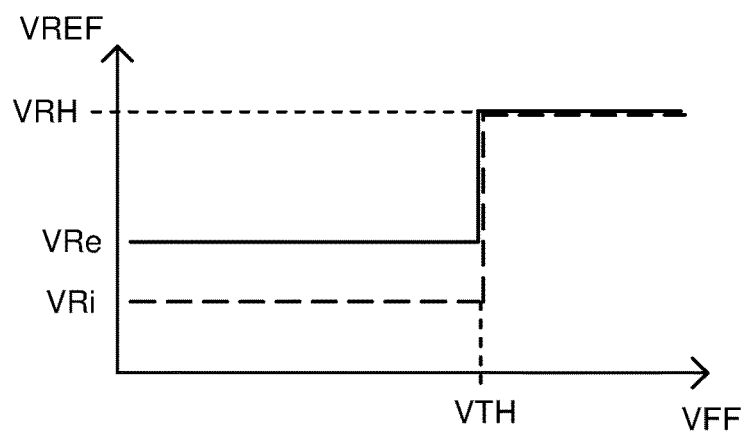
FIG. 11B shows a relationship diagram depicting a reference voltage against a rectification-related signal of a power factor correction control circuit corresponding to FIG. 11A according to an embodiment of the present invention.

Please refer to FIG. 11A along with FIG. 11B. FIG. 11B shows a relationship diagram depicting a reference voltage against a rectification-related signal of a power factor correction control circuit corresponding to FIG. 11A according to an embodiment of the present invention. In the embodiment shown in FIG. 11A, only is the one having a relatively higher voltage level between the preset candidate voltage VRi and the overwriting candidate voltage VRe able to conduct the diode coupled thereto. In other words, in this embodiment, the diode D1 and the diode D2 can be considered as being configured to select the one having a relatively higher voltage level between the preset candidate voltage VRi and the overwriting candidate voltage VRe. In one embodiment, as shown by a solid-line curve in FIG. 11B, a voltage level of the overwriting candidate voltage VRe is higher than a voltage level of the preset candidate voltage VRi and is lower than the second candidate voltage VRH. In this embodiment, when a voltage level of the rectification-related signal VFF is not greater than the threshold voltage VTH, the selector circuit 11 selects the first candidate voltage VRL as the reference voltage VREF. And because the first candidate voltage VRL is decided by the diode D1 and the diode D2, consequently, the reference voltage VREF is decided by the overwriting candidate voltage VRe having a relatively higher voltage level. On the other hand, when the voltage level of the rectification-related signal VFF is greater than the threshold voltage VTH, the selector circuit 11 selects the second candidate voltage VRH as the reference voltage VREF.

It is worthwhile noting that, in the embodiment shown in FIG. 11A, when the overwriting candidate voltage VRe is not set external to the IC or when the overwriting candidate voltage VRe, which is set external to the IC, is lower than the preset candidate voltage VRi, a relationship diagram depicting the rectification-related signal VFF against the reference voltage VREF is illustrated as a long-dashed line curve shown in FIG. 11B. That is, in this case, the reference voltage VREF is decided by either the preset candidate voltage VRi or the second candidate voltage VRH. On the other hand, when the overwriting candidate voltage VRe, which is set external to the IC, is higher than the preset candidate voltage VRi and is lower than the second candidate voltage VRH, a relationship diagram depicting the rectification-related signal VFF against the reference voltage VREF is illustrated as a solid line curve shown in FIG. 11B.

That is, in this case, the reference voltage VREF is decided by either the overwriting candidate voltage VRe or the second candidate voltage VRH. In other words, the overwriting candidate voltage VRe is configured to clamp a low level of the reference voltage VREF, so that the low level of the reference voltage VREF is not lower than the overwriting candidate voltage VRe (if the overwriting candidate voltage VRe is present). Besides, it is worthwhile noting that, in order to clearly illustrate the above-said long-dashed line shown in the FIG. 11B, the present invention intentionally illustrates the above-said long-dashed line in a way that the above-said long-dashed line does not overlap the above-said solid line. Note that, in practical situation, when the voltage level of the rectification-related signal VFF is greater than the threshold voltage VTH, the above-said long-dashed line and the above-said solid line shown in the FIG. 11B actually overlap with each other.

Figure 12A:
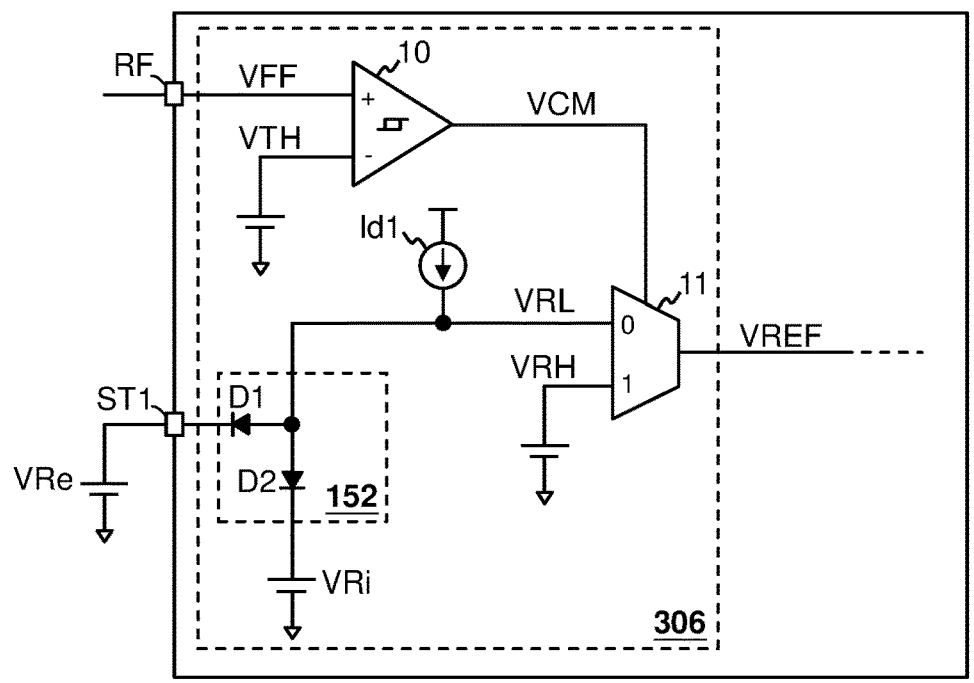
FIG. 12A shows a schematic circuit diagram of a reference voltage generator circuit corresponding to FIG. 10 in a power factor correction control circuit according to another specific embodiment of the present invention.

Please refer to FIG. 12A. FIG. 12A shows a schematic circuit diagram of a reference voltage generator circuit corresponding to FIG. 10 in a power factor correction control circuit according to another specific embodiment of the present invention. The reference voltage generator circuit 306 of this embodiment shown in FIG. 12 is similar to the reference voltage generator circuit 305 of the embodiment shown in FIG. 11A, but is different in the following. Firstly, in the embodiment shown in FIG. 12A, the coupling directions of the diode D1 and the diode D2 of the embodiment shown in FIG. 12A is opposite to the coupling direction of the diode D1 and the diode D2 of the embodiment shown in FIG. 11A. Secondly, a current source Id1 of the embodiment shown in FIG. 12A is coupled between a power supply voltage and the first candidate voltage VRL.

Figure 12B:
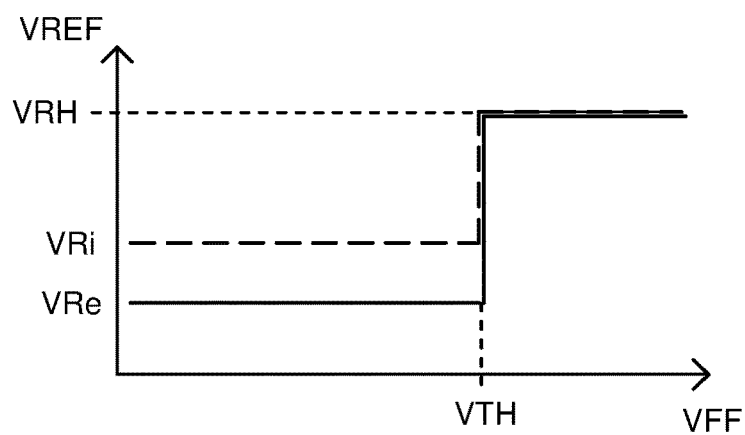
FIG. 12B shows a relationship diagram depicting a reference voltage against a rectification-related signal of a power factor correction control circuit corresponding to FIG. 12A according to an embodiment of the present invention.

Please refer to FIG. 12A along with FIG. 12B. FIG. 12B shows a relationship diagram depicting a reference voltage against rectification-related signal of a power factor correction control circuit corresponding to FIG. 12A according to an embodiment of the present invention. In the embodiment shown in FIG. 12A, only is the one having a relatively lower voltage level between a preset candidate voltage VRi or an overwriting candidate voltage VRe able to conduct the diode coupled thereto. In other words, in this embodiment, the diode D1 and the diode D2 can be considered as being configured to select the one having a relatively lower voltage level between the preset candidate voltage VRi and the overwriting candidate voltage VRe. In one embodiment, as shown by a solid-line curve in FIG. 12B, a voltage level of the overwriting candidate voltage VRe is lower than a voltage level of the preset candidate voltage VRi. In this embodiment, when a voltage level 4 the rectification-related signal VFF is not greater than the threshold voltage VTH, the selector circuit 11 selects the first candidate voltage VRL as the reference voltage VREF. And because the first candidate voltage VRL is decided by the diode D1 and the diode D2, consequently, the reference voltage VREF is decided by the overwriting candidate voltage VRe having a relatively lower voltage level. On the other hand, when the voltage level of the rectification-related signal VFF is greater than the threshold voltage VTH, the selector circuit 11 selects the second candidate voltage VRH as the reference voltage VREF.

It is worthwhile noting that, in the embodiment shown in FIG. 12A, when the overwriting candidate voltage VRe not set external to the IC, or when the overwriting candidate voltage VRe, set external to the IC, is higher than the preset candidate voltage VRi, a relationship diagram depicting the rectification-related signal VFF against the reference voltage VREF is illustrated as a long-dashed line shown in FIG.

12B. That is, in this case, the reference voltage VREF is decided by either the preset candidate voltage VRi or the second candidate voltage VRH. On the other hand, when the overwriting candidate voltage VRe, set external to the IC, is lower than the preset candidate voltage VRi, a relationship diagram depicting the rectification-related signal VFF against the reference voltage VREF is illustrated as a solid line curve shown in FIG. 12B. That is, in this case, the reference voltage VREF is decided by either the overwriting candidate voltage VRe or the second candidate voltage VRH. In other words, the overwriting candidate voltage VRe is configured to clamp a low level of the reference voltage VREF, so that the low level of the reference voltage VREF is not higher than the overwriting candidate voltage VRe (if the overwriting candidate voltage VRe is present). Besides, it is worthwhile noting that, in order to clearly illustrate the above-said long-dashed line shown in the FIG. 12B, the present invention intentionally illustrates the above-said long-dashed line in a way that the above-said long-dashed line does not overlap the above-said solid line. Note that, in practical situation, when the voltage level of the rectification-related signal VFF is greater than the threshold voltage VTH, the above-said long-dashed line and the above-said solid line shown in the FIG. 12B actually overlap with each other. Note that all occurrences of the term "the long-dashed line" and the term "the solid line" in this specification for a relationship diagram depicting the rectification-related signal VFF against the reference voltage VREF will be illustrated in the same way hereinafter in the following embodiments.

Figure 13A:
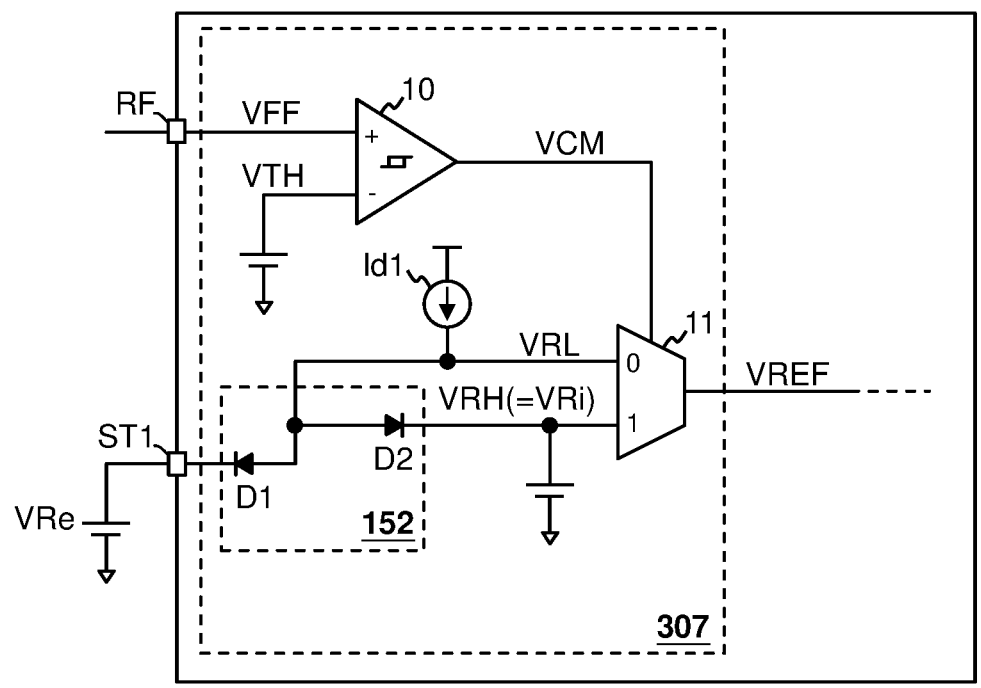
FIG. 13A shows a schematic circuit diagram of a reference voltage generator circuit in a power factor correction control circuit according to a specific embodiment of the present invention.

Please refer to FIG. 13A, which shows a schematic circuit diagram of a reference voltage generator circuit in a power factor correction control circuit according to a specific embodiment of the present invention. The reference voltage generator circuit 307 of this embodiment shown in FIG. 13A is similar to the reference voltage generator circuit 306 of the embodiment shown in FIG. 12, but is different in the following. In the embodiment shown in FIG. 13A, a diode D2 is coupled between a first candidate voltage VRL and a second candidate voltage VRH, such that the second candidate voltage VRH is configured as a preset candidate voltage VRi.

Figure 13B:
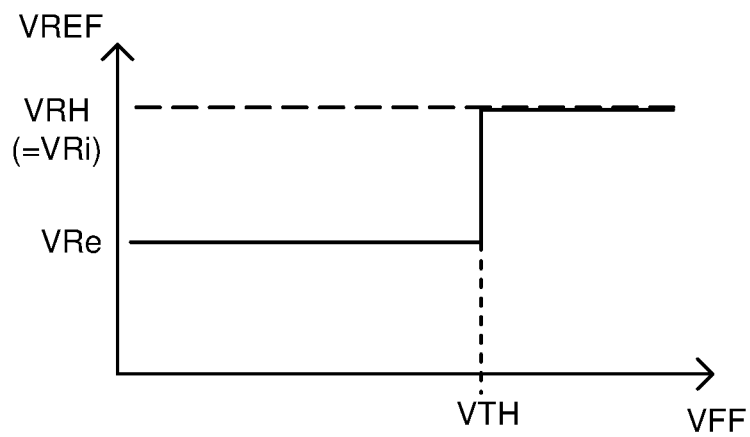
FIG. 13B shows a relationship diagram depicting a reference voltage against a rectification-related signal of a power factor correction control circuit corresponding to FIG. 13A according to an embodiment of the present invention.

Please refer to FIG. 13A along with FIG. 13B. FIG. 13B shows a relationship diagram depicting a reference voltage against a rectification-related signal of a power factor correction control circuit corresponding to FIG. 13A according to an embodiment of the present invention. In the embodiment shown in FIG. 13A, the diode D1 and the diode D2 are configured to select the one having a relatively lower voltage level between the preset candidate voltage VRi and an overwriting candidate voltage VRe. In one embodiment, as shown by a solid curve in FIG. 13B, a voltage level of the overwriting candidate voltage VRe is lower than a voltage level of the preset candidate voltage VRi and is lower than the second candidate voltage VRH. In this embodiment, on one hand, when a voltage level of the rectification-related signal VFF is not greater than the threshold voltage VTH, the selector circuit 11 selects the first candidate voltage VRL as the reference voltage VREF. And because the first candidate voltage VRL is decided by the diode D1 and the diode D2, consequently, the reference voltage VREF is decided by the overwriting candidate voltage VRe having a relatively lower voltage level. On the other hand, when the voltage level of the rectification-related signal VFF is greater than the threshold voltage VTH, the selector circuit 11 selects the second candidate voltage VRH (i.e., preset candidate voltage VRi) as the reference voltage VREF.

It is worthwhile noting that, in the embodiment shown in FIG. 13A, when the overwriting candidate voltage VRe is not set external to the IC or when the overwriting candidate voltage VRe, set external to the IC, is higher than the preset candidate voltage VRi, a relationship diagram depicting the rectification-related signal VFF against the reference voltage VREF is illustrated as a long-dashed line curve shown in FIG. 13B. That is, in this case, no matter whether the voltage level of the rectification-related signal VFF is greater than or smaller than the threshold voltage VTH, the reference voltage VREF is decided by the preset candidate voltage VRi. On the other hand, when the overwriting candidate voltage VRe which is set external to the IC is lower than the preset candidate voltage VRi, a relationship diagram depicting the rectification-related signal VFF against the reference voltage VREF is illustrated as a solid line curve shown in FIG. 13B. That is, in this case, the reference voltage VREF is decided by either the overwriting candidate voltage VRe or the second candidate voltage VRH (i.e., preset candidate voltage VRi).

Figure 14:
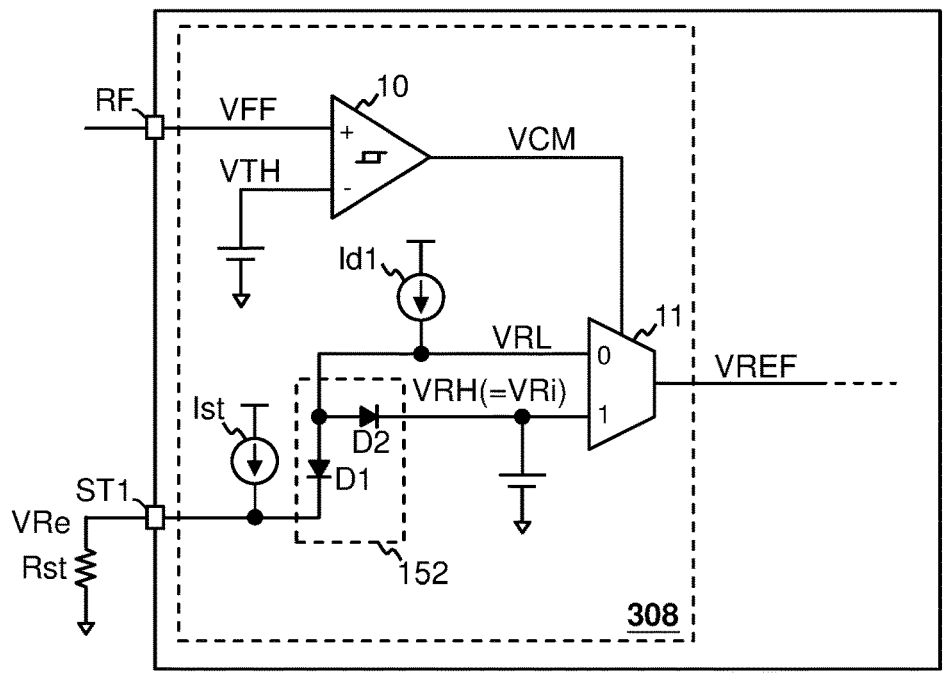
FIG. 14 shows a schematic circuit diagram of a reference voltage generator circuit in a power factor correction control circuit according to a specific embodiment of the present invention.

Please refer to FIG. 14, which shows a schematic circuit diagram of a reference voltage generator circuit in a power factor correction control circuit according to a specific embodiment of the present invention. The reference voltage generator circuit 308 of this embodiment shown in FIG. 14A is similar to the reference voltage generator circuit 307 of the embodiment shown in FIG. 13A, but is different in the following. In the embodiment shown in FIG. 14A, the reference voltage generator circuit 308 further includes: a setting current source Ist. In one embodiment, the setting current source Ist is coupled to a setting resistor Rst located external to the IC via a pin ST1, thereby setting the overwriting candidate voltage VRe external to the IC. In one embodiment, the overwriting candidate voltage VRe is coupled to at least one of the plural diodes 152 via the setting pin ST1. In this embodiment, the overwriting candidate voltage VRe is coupled to a diode D1 via the setting pin ST1.

Figure 15:
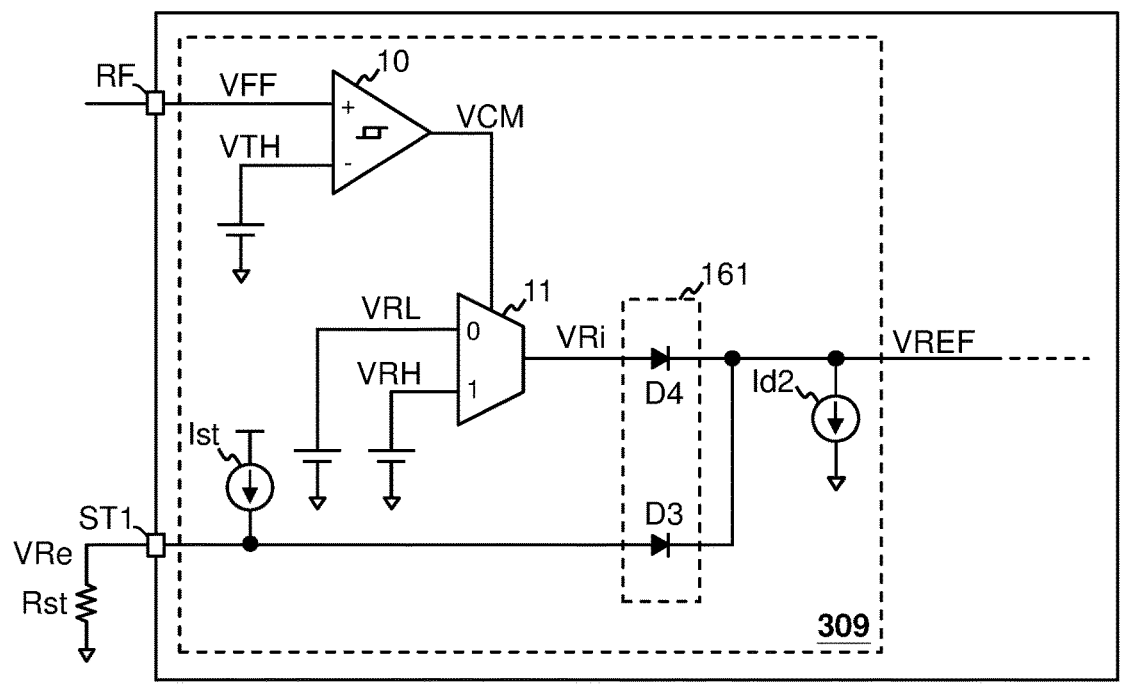
FIG. 15 shows a schematic circuit diagram of a reference voltage generator circuit in a power factor correction control circuit according to a specific embodiment of the present invention.

Please refer to FIG. 15, which shows a schematic circuit diagram of a reference voltage generator circuit in a power factor correction control circuit according to a specific embodiment of the present invention. The reference voltage generator circuit 309 of this embodiment shown in FIG. 15 is similar to the reference voltage generator circuit 302 of the embodiment shown in FIG. 8, but is different in the following. As compared to the reference voltage generator circuit 302 of the embodiment shown in FIG. 8, in one embodiment, the reference voltage generator circuit 309 of this embodiment shown in FIG. 15 further includes: plural diodes 161 and a current source Id2. In one embodiment, a selector circuit 11 is configured to operably select one of a first candidate voltage VRL and a second candidate voltage VRH as a preset candidate voltage VRi according to a comparison signal VCM. In one embodiment, plural diodes 161 includes: a diode D3 and a diode D4, wherein the diode D3 and the diode D4 are configured to operably shunt a preset candidate voltage VRi and an overwriting candidate voltage VRe, so that the diode D3 and the diode D4 are configured to operably select one of the preset candidate voltage VRi and the overwriting candidate voltage VRe as the reference voltage VREF through comparing the preset candidate voltage VRi with the overwriting candidate voltage VRe. In this embodiment, the preset candidate voltage VRi is a constant voltage generated internal to the IC, and the overwriting candidate voltage VRe is generated in a way similar to the embodiment shown in FIG. 14. To be more specific, the overwriting candidate voltage VRe is generated external to the IC through the setting current source Ist and the setting resistor Rst, wherein the overwriting candidate voltage VRe is coupled to the diode D3 via the pin ST1.

To elaborate in more detail, as shown by the embodiment in FIG. 15, the diode D4 is forwardly coupled from the preset candidate voltage VRi to the reference voltage VREF, and the diode D3 is forwardly coupled from the overwriting candidate voltage VRe to the reference voltage VREF, such that the preset candidate voltage VRi and the overwriting candidate voltage VRe are shunted with each other. In this embodiment, the current source Id2 is coupled between the reference voltage VREF and a ground potential, wherein the current source Id2 is configured to ensure the diode D3 or the diode D4 is in forward conduction.

Please refer to FIG. 15 along with FIG. 11B. In the embodiment shown in FIG. 15, only is the one having a relatively higher voltage level between the preset candidate voltage VRi and the overwriting candidate voltage VRe able to conduct the diode coupled thereto. In other words, in this embodiment, the diode D3 and the diode D4 can be considered as being configured to select the one having a relatively higher voltage level between the preset candidate voltage VRi and the overwriting candidate voltage VRe. In the embodiment shown in FIG. 15, a relationship between a reference voltage VREF and a rectification-related signal VFF is as shown in FIG. 11B, of which the details can be referred to the aforementioned descriptions related to FIG. 11B and are not redundantly repeated here.

It is worthwhile noting that, in the embodiment shown in FIG. 15, when a diode D3 is inversely connected to a diode D4 and when a current source Id2 is coupled between a power supply voltage and a reference voltage VREF, a relationship between a reference voltage VREF and a rectification-related signal VFF is as shown in FIG. 12B. As a result, in this case, in regard to the details and features pertinent to the relationship between the reference voltage VREF and the rectification-related signal VFF, of which the details can be referred to the aforementioned descriptions related to FIG. 12A and FIG. 12B and are not redundantly repeated here. Besides, it is worthwhile noting that, the various coupling configurations of the plural diodes as shown and described in the specific embodiments of the present invention are only illustrative examples, but not for limiting the broadest scope of the present invention.

Figure 16:
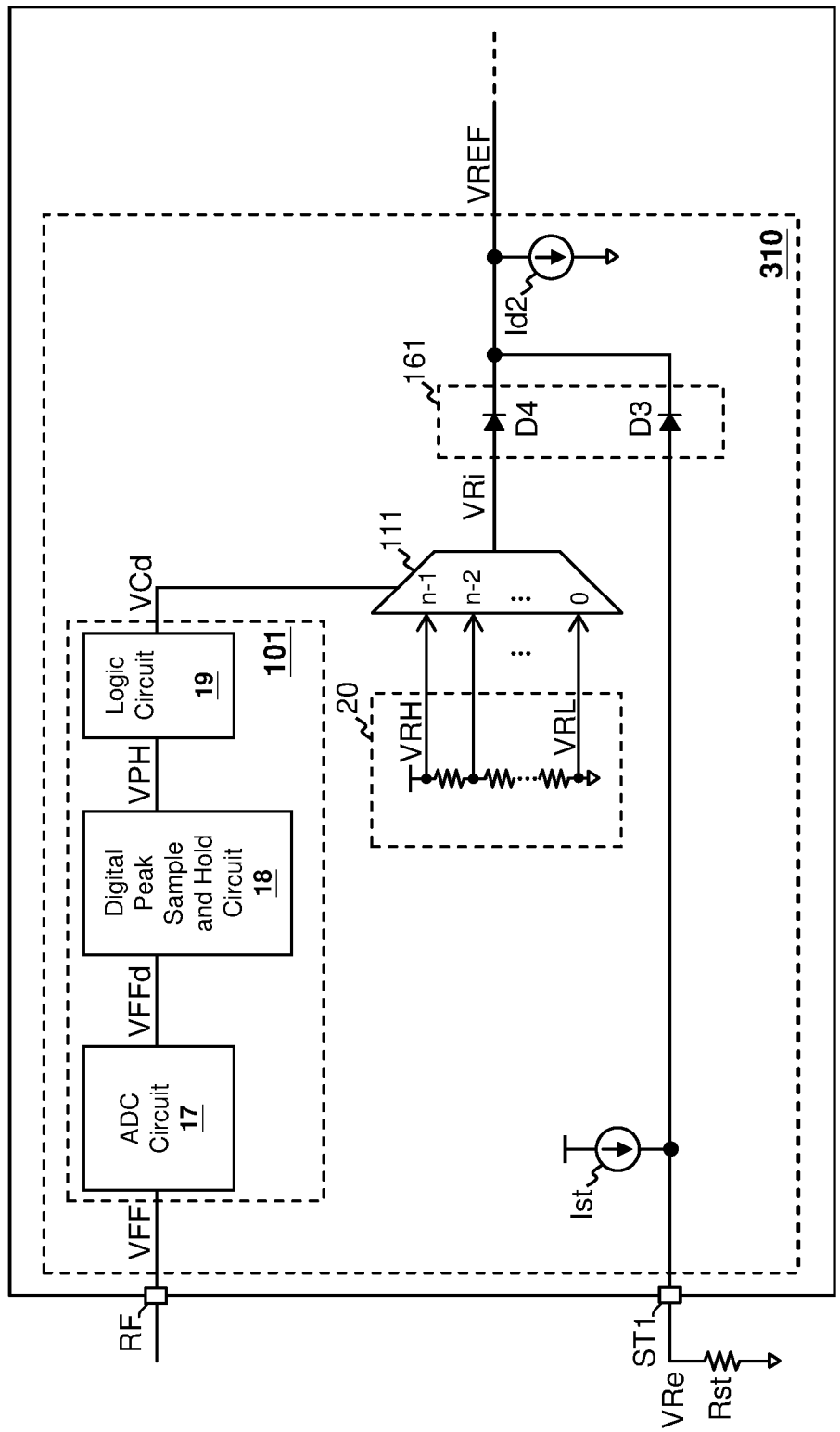
FIG. 16 shows a schematic circuit diagram of a reference voltage generator circuit in a power factor correction control circuit according to an embodiment of the present invention.

Please refer to FIG. 16, which shows a schematic circuit diagram of a reference voltage generator circuit in a power factor correction control circuit according to an embodiment of the present invention. The reference voltage generator circuit 310 of this embodiment shown in FIG. 16 is similar to the reference voltage generator circuit 309 of the embodiment shown in FIG. 15, but is different in the following. As compared to the reference voltage generator circuit 309 of the embodiment shown in FIG. 15, the reference voltage generator circuit 310 of this embodiment shown in FIG. 16 further includes: a voltage divider circuit 20. A selector circuit 111 in the reference voltage generator circuit 310 is a multi-level selector circuit. A comparator circuit 101 in the reference voltage generator circuit 310 includes: an analog-to-digital conversion (ADC) circuit 17, a digital peak sample and hold circuit 18 and a logic circuit 19.

In one embodiment, as shown in FIG. 16, the ADC circuit 17 is configured to convert a rectification-related signal VFF to a digital rectification-related signal VFFd. The digital peak sample and hold circuit 18 is configured to sample and hold a peak of the digital rectification-related signal VFFd, so as to generate a sample-and-hold signal VPH. The logic circuit 19 is configured to generate a comparison signal VCd according to the sample-and-hold signal VPH (e.g., by re-mapping). In this embodiment, the comparison signal VCd is a multi-level digital signal. In one embodiment, the voltage-divider circuit 20 includes: plural resistors are configured to operably generate n-level candidate voltages by voltage division, wherein n denotes a positive integer greater than or equal to three. In this embodiment, voltage-divider circuit 20 is configured to operably generate multi-level candidate voltages which lie between a first candidate voltage VRL and a second candidate voltage VRH. The first candidate voltage VRL and the second candidate voltage VRH are a minimum voltage and a maximum voltage among the n-level candidate voltages, respectively. In one embodiment, the selector circuit 111 is configured to operably select one of the n-level candidate voltages as the preset candidate voltage VRi according to a comparison signal VCd. In regard to rest details and rest features pertinent to the reference voltage generator circuit 310 which are not mentioned in this embodiment, please refer to the descriptions recited in the embodiment shown in FIG. 15, so the details thereof are not redundantly repeated here.

Figure 17A:
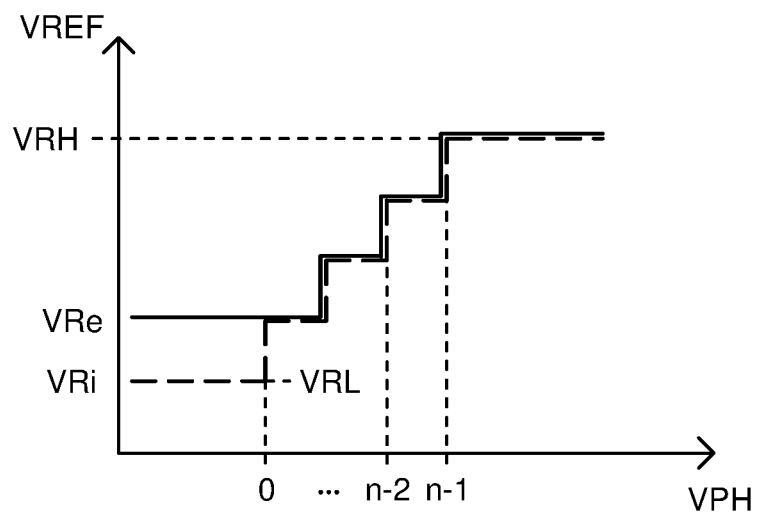
FIG. 17A shows a relationship diagram depicting a reference voltage against a sample-and-hold signal of a power factor correction control circuit corresponding to FIG. 16 according to an embodiment of the present invention.

Please refer to FIG. 16 along with FIG. 17A. FIG. 17A shows a relationship diagram depicting a reference voltage against a sample-and-hold signal of a power factor correction control circuit corresponding to FIG. 16 according to an embodiment of the present invention. In the embodiment shown in FIG. 16, the diode D3 and the diode D4 are configured to select the one having a relatively higher voltage level between the preset candidate voltage VRi and the overwriting candidate voltage VRe. In one embodiment, as shown by a solid curve in FIG. 17A, a voltage level of the overwriting candidate voltage VRe is higher than a voltage level of the preset candidate voltage VRi and is lower than the second candidate voltage VRH. In the embodiment shown in FIG. 16, when the overwriting candidate voltage VRe is not set external to the IC or when the overwriting candidate voltage VRe, set external to the IC, is lower than the preset candidate voltage VRi, a relationship diagram depicting the sample-and-hold signal VPH against the reference voltage VREF is illustrated as a long-dashed line curve shown in FIG. 17A. That is, in this case, the reference voltage VREF is decided by the preset candidate voltage VRi. On the other hand, when the overwriting candidate voltage VRe which is set at external to the IC is higher than the preset candidate voltage VRi and is lower than the second candidate voltage VRH, a relationship diagram depicting the sample-and-hold signal VPH against the reference voltage VREF is illustrated as a solid line curve shown in FIG. 11B. That is, in this case, the reference voltage VREF is decided by the overwriting candidate voltage VRe. In other words, the overwriting candidate voltage VRe is configured to clamp a low level of the reference voltage VREF. In this embodiment, because the selector circuit 111 is configured to operably select the n-level candidate voltages according to the comparison signal VCd, as shown in FIG. 17A, the reference voltage generator circuit 310 can generate a multi-level reference voltage VREF based upon the rectification-related signal VFF.

Figure 17B:
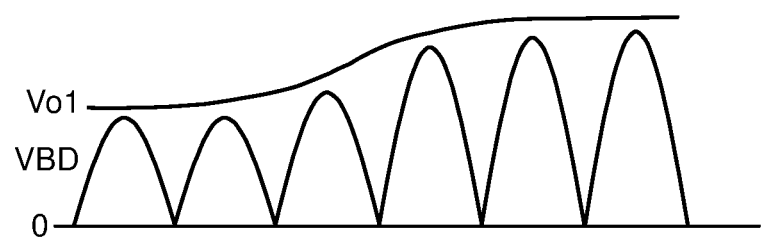
FIG. 17B illustrates signal waveform diagrams depicting a rectified voltage and an output voltage corresponding to FIG. 16 associated with the operation of the power supply system according to an embodiment of the present invention.

Please refer to FIG. 16 along with FIG. 17B. FIG. 17B illustrates signal waveform diagrams depicting a rectified voltage corresponding to FIG. 16 and an output voltage corresponding to FIG. 16 associated with the operation of the power supply system according to an embodiment of the present invention. According to the explanations described in the aforementioned embodiment shown in FIG. 17A, because the reference voltage VREF can be adjusted with multi-level based upon the rectification-related signal VFF, as shown in FIG. 17B, an output voltage Vo1 can therefore be adjusted in multi-level based upon the peak of a rectified voltage VBD. As compared to the embodiment shown in FIG. 3, the output voltage Vo1 is substantially positively correlated with the peak of the rectified voltage VBD. As a result, in this case, unwanted energy consumption of MOS devices (i.e., switch Sw) in the power stage circuit 500 can be effectively reduced. Moreover, because a size of the inductor L in the power stage circuit 500 can be shrinked, conversion efficiency of the present invention can be desirably enhanced.

Figure 18:
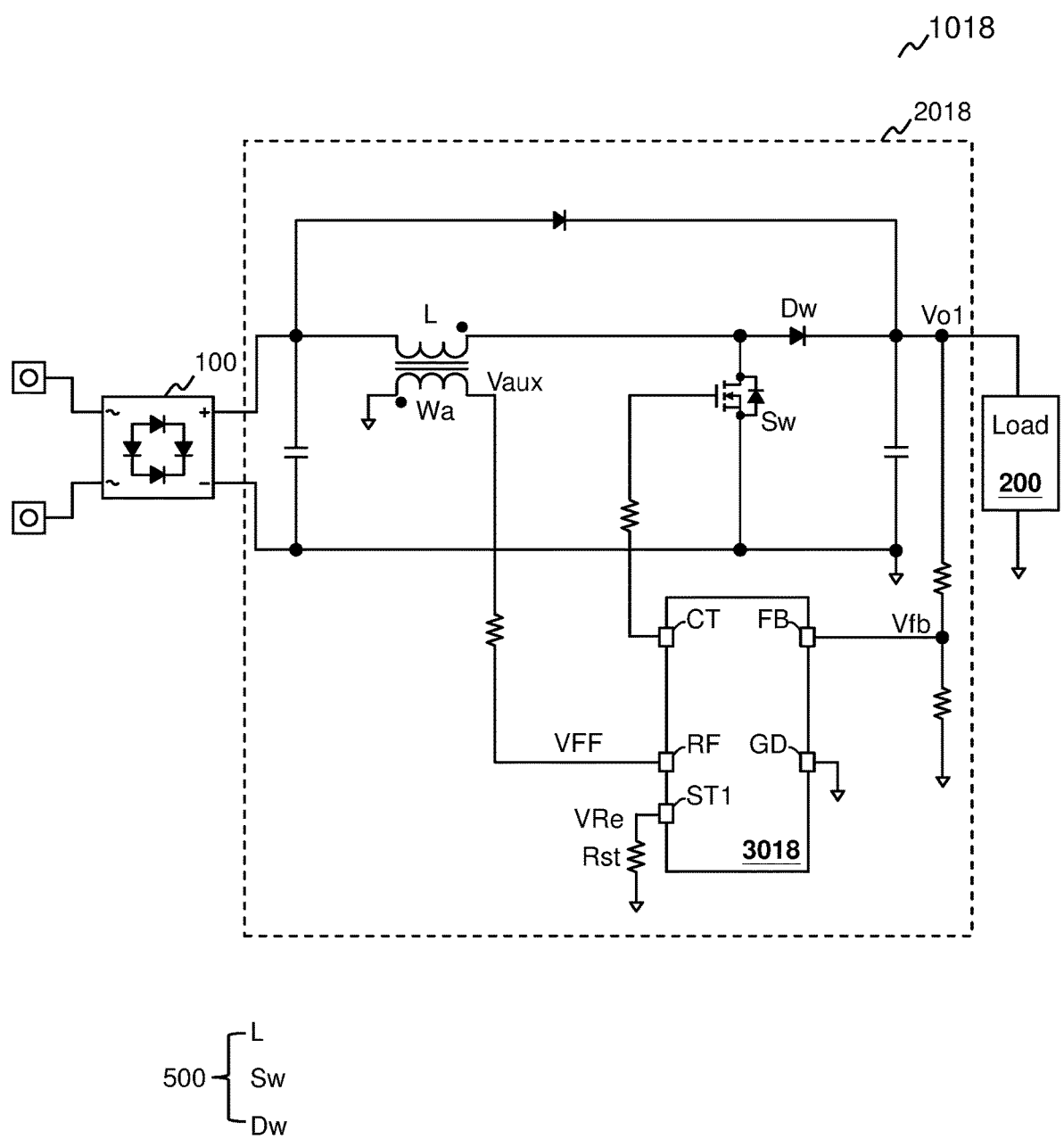
FIG. 18 shows a block diagram of a power supply system according to an embodiment of the present invention.

Please refer to FIG. 18, which shows a block diagram of a power supply system according to an embodiment of the present invention. In one embodiment, in the power supply system 1018 of the embodiment shown in FIG. 18, a power factor correction conversion circuit 2018 further includes: an auxiliary winding Wa. In one embodiment, as shown in FIG. 18, the auxiliary winding Wa is magnetically coupled to an inductor L, so as to generate an auxiliary voltage Vaux, thus generating a rectification-related signal VFF. The rectification-related signal VFF is connected to inside of a power factor correction control circuit (i.e., IC) 3018 via a pin RF. In this embodiment, the auxiliary voltage Vaux and the rectified voltage VBD out-of-phase to each other. In one embodiment, a pin GD of the power factor correction control circuit 3018 is coupled to a ground potential. The operation details inside the power factor correction control circuit 3018 will be elaborated in more detail in the following embodiments, and rest details and rest features pertinent to the power factor correction conversion circuit 2018 are described in the foregoing embodiments.

Figure 19A:
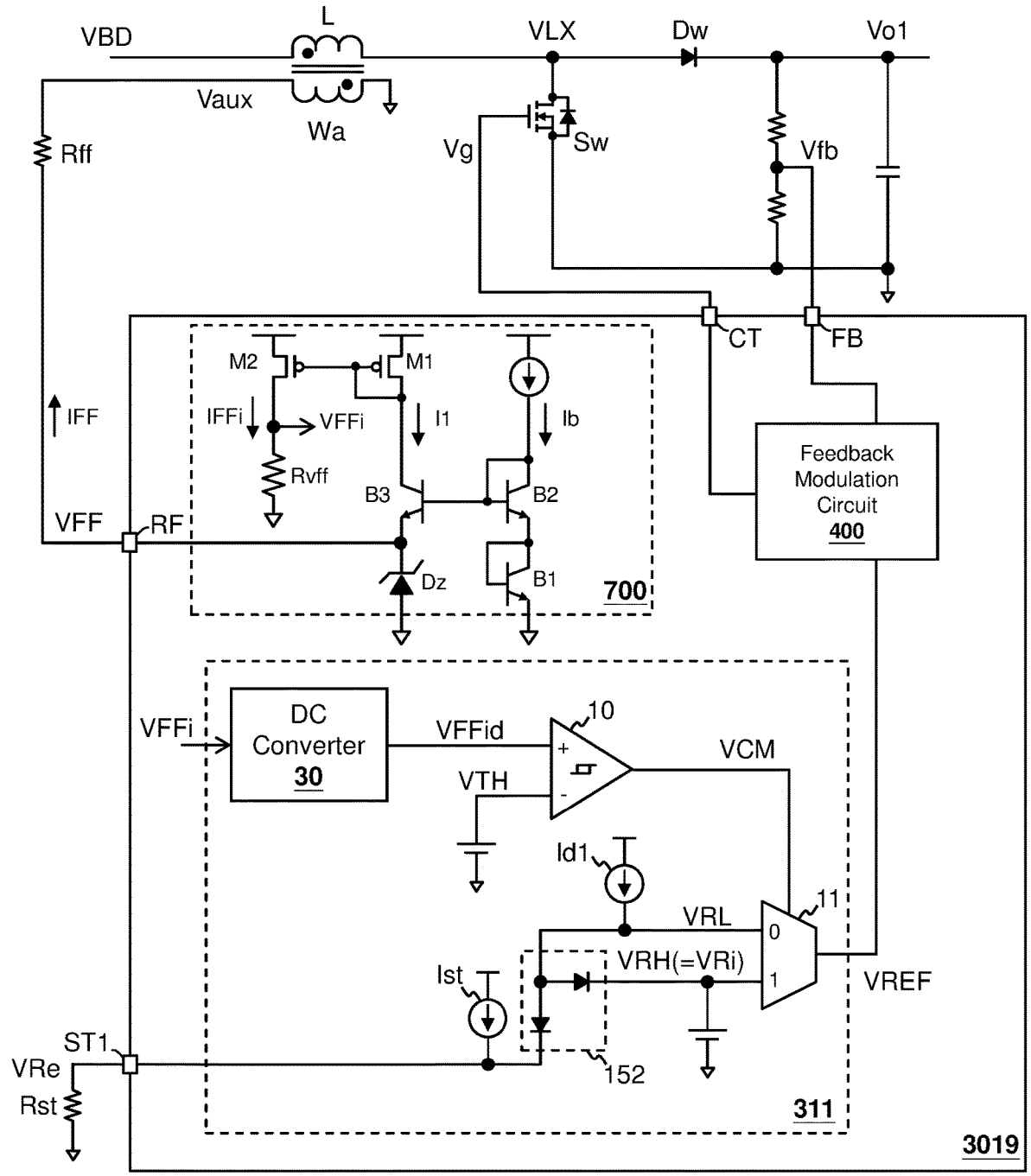
FIG. 19A shows a schematic diagram of a power factor correction conversion circuit in a power supply system according to a specific embodiment of the present invention.

Please refer to FIG. 19A, which shows a schematic diagram of a power factor correction conversion circuit in a power supply system according to a specific embodiment of the present invention. A power factor correction control circuit 3019 in a power factor correction conversion circuit 2019 shown in FIG. 19A is literally a specific embodiment of the power factor correction control circuit 3018 shown in FIG. 18. In one specific embodiment, as shown in FIG. 19A, the power factor correction control circuit 3019 further includes a clamp and detection circuit 700. In one embodiment, the clamp and detection circuit 700 is configured to clamp a voltage of a rectification-related signal VFF via a pin RF. The clamp and detection circuit 700 includes: a transistor B1, a transistor B2, a transistor B3, a transistor M1, a transistor M2, a resistor Rvff and a diode Dz.

In one embodiment, the transistor B1, the transistor B2 and the transistor B3 are bipolar junction transistors (BJT) having a same conductivity type, wherein each of the transistor B1 and the transistor B2 is a diode-connected BJT. The transistor M1 and the transistor M2 are metal-oxide-semiconductor (MOS) transistors having a same conductivity type. In one embodiment, the diode Dz is a Zener diode. The diode Dz is configured to clamp the voltage of the rectification-related signal VFF via the pin RF, such that the voltage of the rectification-related signal VFF is not lower than a predetermined negative voltage and is not higher than a predetermined positive voltage. In this embodiment, the aforementioned predetermined negative voltage is an opposite number of a forward bias voltage of the Zener diode, and the predetermined positive voltage is an opposite number of a reverse bias voltage of the Zener diode.

Figure 19B:
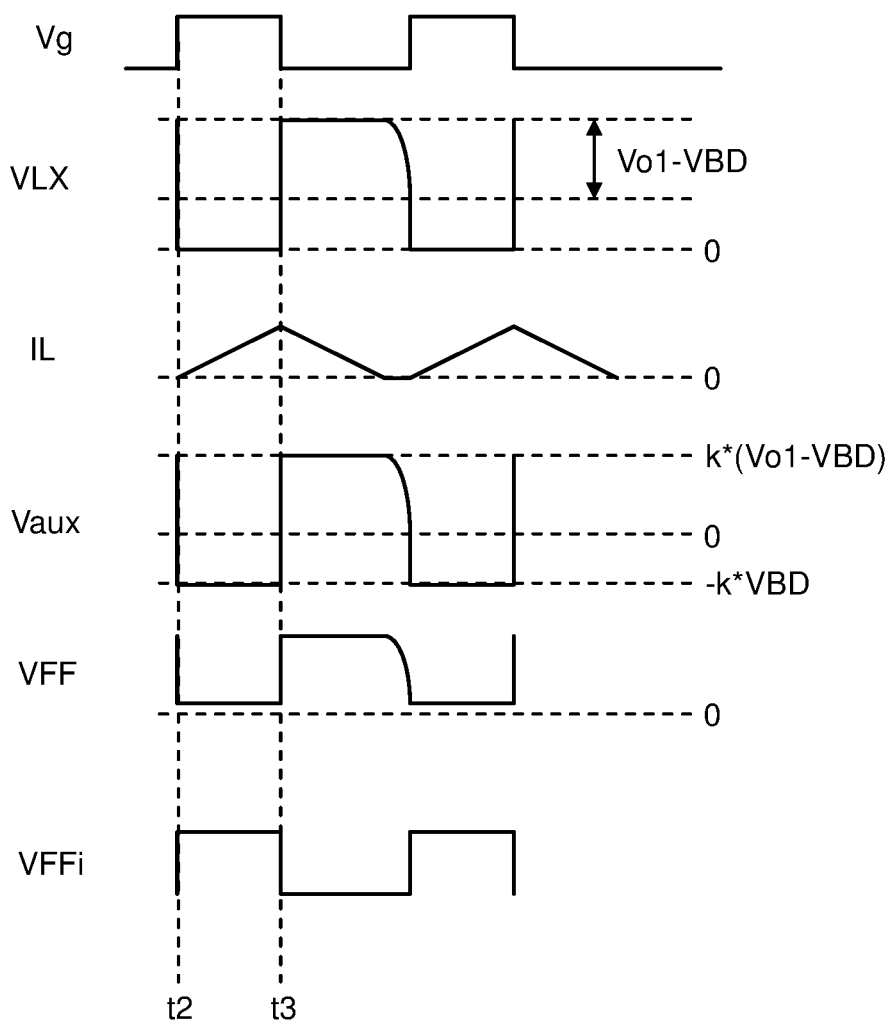
FIG. 19B illustrates signal waveform diagrams depicting signals associated with the operation of a power factor correction conversion circuit corresponding to FIG. 19A.

Please refer to FIG. 19A along with FIG. 19B. FIG. 19B illustrates signal waveform diagrams depicting signals associated with the operation of a power factor correction conversion circuit corresponding to FIG. 19A. In one embodiment, as shown in FIG. 19A, the clamp and detection circuit 700 is configured to generate a current IFFi via a common base amplifier which includes the transistor B1, the transistor B2, the transistor B3 and the diode Dz, wherein the current IFFi is correlated with a current IFF and is correlated with the rectified voltage VBD. In one embodiment, the resistor Rvff is configured to generate a voltage VFFi related to the rectified voltage VBD in response to the current IFFi.

To elaborate in more detail, in one embodiment, during a period from a time point t2 to a time point t3 shown in FIG. 19B, this embodiment is configured to operably control a control signal Vg of a switch Sw to a high level, so that an inductor current IL begins to ramp up. The clamp and detection circuit 700 is configured to operably clamp the rectification-related signal VFF at a level which is close to zero voltage. A level of the auxiliary voltage Vaux is negative, so the current IFF flows from the rectification-related signal VFF to the auxiliary voltage Vaux.

It is worthwhile noting that, as shown in FIG. 19B, according to a waveform indicative of a voltage VLX at one end of an inductor L and a waveform indicative of the auxiliary voltage Vaux (note that k shown in FIG. 19B denotes a constant), this embodiment shows that: because the auxiliary voltage Vaux is correlated with the rectified voltage VBD and because the current IFF is correlated with the auxiliary voltage Vaux, the current IFFi is therefore correlated with the rectified voltage VBD, thereby the voltage VFFi is correlated with the rectified voltage VBD.

Please still refer to FIG. 19A. In one embodiment, as compared to the reference voltage generator circuit 308 of the embodiment shown in FIG. 14, a reference voltage generator circuit 311 in the power factor correction control circuit 3019 of this embodiment shown in FIG. 19A further includes: a direct current (DC) converter 30 which is configured to operably generate a digital signal VFFid based upon the voltage VFFi. The reference voltage generator circuit 311 has same rest operation details as the reference voltage generator circuit 308, which can be referred to the detailed descriptions mentioned in the embodiment shown in FIG. 14.

Figure 20:
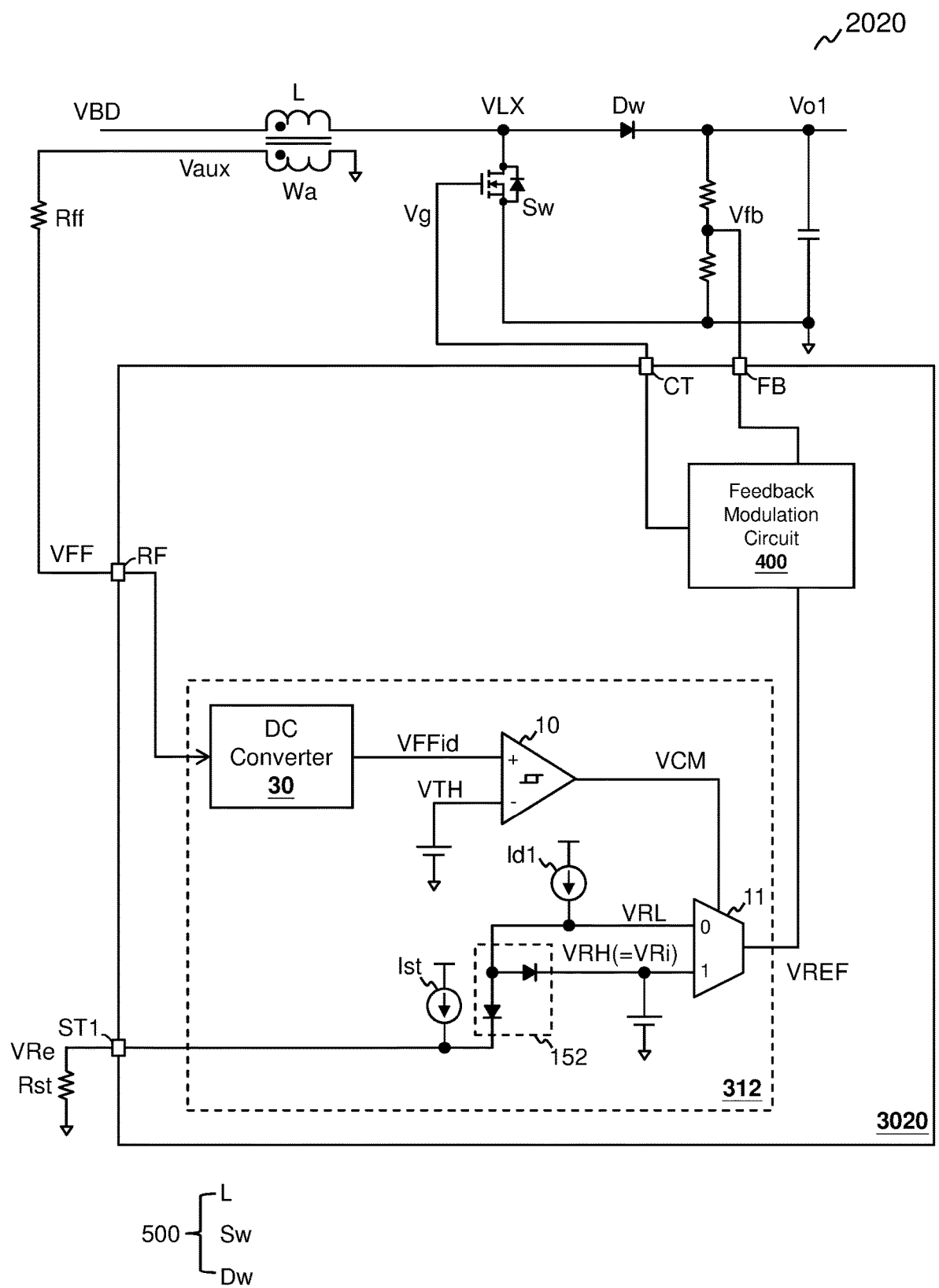
FIG. 20 shows a schematic diagram of a power factor correction conversion circuit in a power supply system according to an embodiment of the present invention.

Please refer to FIG. 20, which shows a schematic diagram of a power factor correction conversion circuit in a power supply system according to an embodiment of the present invention. The power factor correction conversion circuit 2020 of this embodiment shown in FIG. 20 is similar to the power factor correction conversion circuit 2019 of the embodiment shown in FIG. 19, but is different in the following. The magnetic coupling direction between the auxiliary winding Wa and the inductor L in this embodiment shown in FIG. 20 is opposite to the embodiment shown in FIG. 19A. That is, in this case, an auxiliary voltage Vaux and a rectified voltage VBD are in phase with each other. Another difference between the power factor correction conversion circuit 2020 of this embodiment shown in FIG. 20 and the power factor correction conversion circuit 2019 of the embodiment shown in FIG. 19 lies in that: a reference voltage generator circuit 312 in a power factor correction control circuit 3020 of this embodiment shown in FIG. 20 is configured to directly generate a reference voltage VREF in response to a rectification-related signal VFF. The power factor correction control circuit 3020 has same rest operation details as the power factor correction control circuit 3019, which can be shown in FIG. 19A.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power factor correction control circuit, which is configured to operably correct a power factor of a rectified power to generate an output power supplied to a load; the power factor correction control circuit comprising:
    a reference voltage generator circuit, which is configured to operably generate reference voltage according to a rectified voltage of the rectified power; and
    a feedback modulation circuit, which is configured to operably generate a modulation control signal based upon the reference voltage and a feedback signal related to an output voltage of the output power, so as to control at least one switch of a power stage circuit to switch an inductor in the power stage circuit and to thereby regulate the output voltage;
    wherein the reference voltage generator circuit is configured to operably select one of at least two candidate voltages as the reference voltage according to a comparison result between the rectified voltage and at least one determination threshold, such that the output voltage is at least partially positively correlated with the rectified voltage.

2. The power factor correction control circuit as claimed in claim 1, wherein the power factor correction control circuit is implemented as an integrated circuit (IC), wherein the at least two candidate voltages are generated through one of the following ways:
    at least one of the at least two candidate voltages is generated internal to the IC;
    at least one of the at least two candidate voltages is generated external to the IC; or
    wherein the at least two candidate voltages include: two candidate voltages, wherein the two candidate voltages are both generated internal to the IC.

3. The power factor correction control circuit as claimed in claim 2, wherein the at least two candidate voltages include:
    a first candidate voltage and a second candidate voltage;
    wherein the first candidate voltage is generated external to the IC, and the second candidate voltage is generated internal to the IC;
    wherein the at least one determination threshold includes: a first determination threshold;
    wherein the reference voltage generator circuit includes:
    a comparator circuit, which is configured to operably compare a rectification-related signal with a threshold voltage, so as to generate a comparison signal, wherein the rectification-related signal is correlated with the rectified voltage, and the threshold voltage is correlated with the first determination threshold; and
    a selector circuit, which is configured to operably select one of the first candidate voltage and the second candidate voltage as the reference voltage according to the comparison signal.

4. The power factor correction control circuit as claimed in claim 3, wherein the reference voltage generator circuit further includes:
    a plurality of diodes, which are configured to operably shunt a preset candidate voltage and an overwriting candidate voltage, so that the plurality of diodes are configured to operably select one of the preset candidate voltage overwriting candidate voltage as the first candidate voltage through comparing the preset candidate voltage with the overwriting candidate voltage;
    wherein the overwriting candidate voltage is generated external to the IC and is an external programmable voltage level.

5. The power factor correction control circuit as claimed in claim 4, wherein one of the plurality of diodes is coupled between the first candidate voltage and the second candidate voltage, so that the second candidate voltage is configured as the preset candidate voltage.

6. The power factor correction control circuit as claimed in claim 4, wherein the reference voltage generator circuit further includes:
    a setting current source, which is configured to operably provide a setting current at a setting pin of the IC;
    wherein the setting current is configured to operably set the overwriting candidate voltage external to the IC, wherein the overwriting candidate voltage is coupled to at least one of the plurality of diodes via the setting pin.

7. The power factor correction control circuit as claimed in claim 3, wherein the reference voltage generator circuit further includes:
    a plurality of diodes, which are configured to operably shunt a preset candidate voltage and an overwriting candidate voltage, so that the plurality of diodes are configured to operably select one of the preset candidate voltage and the overwriting candidate voltage as the reference voltage through comparing the preset candidate voltage with the overwriting candidate voltage;
    wherein the overwriting candidate voltage is generated external to the IC and is an external programmable voltage level;
    wherein the selector circuit is configured to operably select one of the first candidate voltage and the second candidate voltage as the preset candidate voltage according to the comparison signal.

8. The power factor correction control circuit as claimed in claim 4, wherein the overwriting candidate voltage is configured to operably clamp the preset candidate voltage, such that the reference voltage is clamped at the overwriting candidate voltage.

9. The power factor correction control circuit as claimed in claim 3, wherein:
    the rectification-related signal is generated by dividing and filtering the rectified voltage; or
    the rectification-related signal is generated by an auxiliary winding, wherein the auxiliary winding is magnetically coupled to the inductor, wherein the power stage circuit is configured to operably switch the inductor, so as to convert the rectified voltage to the output voltage.

10. The power factor correction control circuit as claimed in claim 1, wherein the power stage circuit operates in a boundary conduction mode (BCM) or a discontinuous conduction mode (DCM).

11. A power supply system, comprising:
a rectifier, which is configured to operably convert an alternating current (AC) power to a rectified power; and
a power factor correction conversion circuit, which is configured to operably convert the rectified power to an output power supplied to a load;
wherein the power factor correction conversion circuit includes:
a power stage circuit including: at least one switch and an inductor; and
a power factor correction control circuit, which is configured to operably correct a power factor of the rectified power, wherein the power factor correction control circuit includes:
a reference voltage generator circuit, which is configured to operably generate a reference voltage according to a rectified voltage of the rectified power; and
a feedback modulation circuit, which is configured to operably generate a modulation control signal based upon the reference voltage and a feedback signal related to an output voltage of the output power, so as to control at least one switch of a power stage circuit to switch an inductor in the power stage circuit and to thereby regulate the output voltage;
wherein the reference voltage generator circuit is configured to operably select one of at least two candidate voltages as the reference voltage according to a comparison result between the rectified voltage and at least one determination threshold, such that the output voltage is at least partially positively correlated with the rectified voltage.

12. The power supply system as claimed in claim 11, wherein the load includes:
an isolated power conversion circuit having:
a transformer, a primary side switching circuit and a secondary side switching circuit;
wherein a primary side winding and a secondary side winding of the transformer are coupled to the primary side switching circuit and the secondary side switching circuit, respectively;
wherein the isolated power conversion circuit is configured to operably convert the output power coupled to the primary side switching circuit to another output power coupled to the secondary side switching circuit.

13. The power supply system as claimed in claim 11, wherein the power factor correction control circuit is implemented as an integrated circuit (IC), wherein the at least two candidate voltages are generated through one of the following ways:
at least one of the at least two candidate voltages is generated internal to the IC;
at least one of the at least two candidate voltages is generated external to the IC; or
wherein the at least two candidate voltages include: two candidate voltages, wherein the two candidate voltages are both generated internal to the IC.

14. The power supply system as claimed in claim 13, wherein the at least two candidate voltages include:
a first candidate voltage and a second candidate voltage;
wherein the first candidate voltage is generated external to the IC, and the second candidate voltage is generated internal to the IC;
wherein the at least one determination threshold includes:
a first determination threshold;
wherein the reference voltage generator circuit includes:
a comparator circuit, which is configured to operably compare a rectification-related signal with a threshold voltage, so as to generate a comparison signal, wherein the rectification-related signal is correlated with the rectified voltage, and the threshold voltage is correlated with the first determination threshold; and
a selector circuit, which is configured to operably select one of the first candidate voltage and the second candidate voltage as the reference voltage according to the comparison signal.

15. The power supply system as claimed in claim 14, wherein the reference voltage generator circuit further includes:
a plurality of diodes, which are configured to operably shunt a preset candidate voltage and an overwriting candidate voltage, so that the plurality of diodes are configured to operably select one of the preset candidate voltage and the overwriting candidate voltage as the first candidate voltage through comparing the preset candidate voltage with the overwriting candidate voltage;
wherein the overwriting candidate voltage is generated external to the IC and is an external programmable voltage level.

16. The power supply system as claimed in claim 15, wherein one of the plurality of diodes is coupled between the first candidate voltage and the second candidate voltage, so that the second candidate voltage is configured as the preset candidate voltage.

17. The power supply system as claimed in claim 15, wherein the reference voltage generator circuit further includes:
a setting current source, which is configured to operably provide a setting current at a setting pin of the IC;
wherein the setting current is configured to operably set the overwriting candidate voltage external to the IC, wherein the overwriting candidate voltage is coupled to at least one of the plurality of diodes via the setting pin.

18. The power supply system as claimed in claim 14, wherein the reference voltage generator circuit further includes:
a plurality of diodes, which are configured to operably shunt a preset candidate voltage and an overwriting candidate voltage, so that the plurality of diodes are configured to operably select one of the preset candidate voltage and the overwriting candidate voltage as the reference voltage through comparing the preset candidate voltage with the overwriting candidate voltage;
wherein the overwriting candidate voltage is generated external to the IC and is an external programmable voltage level;
wherein the selector circuit is configured to operably select one of the first candidate voltage and the second candidate voltage as the preset candidate voltage according to the comparison signal.

19. The power supply system as claimed in claim 15, wherein the overwriting candidate voltage is configured to operably clamp the preset candidate voltage, such that the reference voltage is clamped at the overwriting candidate voltage.

20. The power supply system as claimed in claim 14, wherein:
the rectification-related signal is generated by dividing and filtering the rectified voltage; or
the rectification-related signal is generated by an auxiliary winding, wherein the auxiliary winding is magnetically coupled to the inductor, wherein the power stage circuit is configured to operably switch the inductor, so as to convert the rectified voltage to the output voltage.

21. The power supply system as claimed in claim 11, wherein the power stage circuit operates in a boundary conduction mode (BCM) or a discontinuous conduction mode (DCM).

22. A control method, which is configured to operably correct a power factor of a rectified power to generate an output power supplied to a load; the control method comprising the following steps:
generating a reference voltage according to a rectified voltage of the rectified power; and
generating a modulation control signal based upon the reference voltage and a feedback signal related to an output voltage of the output power, so as to control at least one switch of a power stage circuit to switch an inductor in the power stage circuit and to thereby regulate the output voltage;
wherein the step for generating the reference voltage includes the following steps:
selecting one of at least two candidate voltages as the reference voltage according to a comparison result between the rectified voltage and at least one determination threshold, such that the output voltage is at least partially positively correlated with the rectified voltage.

23. The control method as claimed in claim 22, wherein the at least two candidate voltages include:
a first candidate voltage and a second candidate voltage;
wherein the first candidate voltage is generated external to the IC, and the second candidate voltage is generated internal to the IC;
wherein the at least one determination threshold includes: a first determination threshold;
wherein the step for generating the reference voltage further includes the following steps:
comparing a rectification-related signal with a threshold voltage, so as to generate a comparison signal, wherein the rectification-related signal is correlated with the rectified voltage, and the threshold voltage is correlated with the first determination threshold; and
selecting one of the first candidate voltage and the second candidate voltage as the reference voltage according to the comparison signal.

24. The control method as claimed in claim 22, wherein the step for generating the reference voltage further includes the following steps:
shunting a preset candidate voltage and an overwriting candidate voltage, so as to select one of the preset candidate voltage and the overwriting candidate voltage as the first candidate voltage through comparing the preset candidate voltage with the overwriting candidate voltage.

25. The control method as claimed in claim 24, wherein the step for generating the reference voltage further includes the following steps:
configuring the second candidate voltage as the preset candidate voltage.

26. The control method as claimed in claim 23, wherein the step for generating the reference voltage further includes the following steps:
shunting a preset candidate voltage and an overwriting candidate voltage, so as to select one of the preset candidate voltage and the overwriting candidate voltage as the reference voltage through comparing the preset candidate voltage with the overwriting candidate voltage; and
selecting one of the first candidate voltage and the second candidate voltage as the preset candidate voltage according to the comparison signal;
wherein the overwriting candidate voltage is a programmable voltage level.

27. The control method as claimed in claim 24, wherein the step for generating the reference voltage further includes the following steps:
clamping the preset candidate voltage via the overwriting candidate voltage, such that the reference voltage is clamped at the overwriting candidate voltage.

28. The control method as claimed in claim 22, further comprising the following steps:
controlling the power stage circuit to operate in a boundary conduction mode (BCM) or a discontinuous conduction mode (DCM).

* * * * *